United States Patent
Park et al.

(10) Patent No.: US 10,136,337 B2
(45) Date of Patent: Nov. 20, 2018

(54) METHOD AND APPARATUS FOR ACQUIRING CHANNEL STATE INFORMATION IN ANTENNA ARRAY

(71) Applicant: LG ELECTRONICS INC., Seoul (KR)

(72) Inventors: Sungho Park, Seoul (KR); Jaehoon Chung, Seoul (KR); Sunam Kim, Seoul (KR); Soocheol Kyeong, Seoul (KR); Jinmin Kim, Seoul (KR); Kitae Kim, Seoul (KR); Kyunghaeng Lee, Seoul (KR); Hyunsoo Ko, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 14/777,315

(22) PCT Filed: Feb. 10, 2014

(86) PCT No.: PCT/KR2014/001093
§ 371 (c)(1),
(2) Date: Sep. 15, 2015

(87) PCT Pub. No.: WO2014/157824
PCT Pub. Date: Oct. 2, 2014

(65) Prior Publication Data
US 2016/0021551 A1    Jan. 21, 2016

Related U.S. Application Data

(60) Provisional application No. 61/805,934, filed on Mar. 28, 2013.

(51) Int. Cl.
*H04W 16/28* (2009.01)
*H04B 7/06* (2006.01)

(52) U.S. Cl.
CPC .......... *H04W 16/28* (2013.01); *H04B 7/0619* (2013.01); *H04B 7/0626* (2013.01)

(58) Field of Classification Search
CPC ..................................................... H04W 16/28
See application file for complete search history.

(56) References Cited

U.S. PATENT DOCUMENTS

2013/0010880 A1    1/2013  Koivisto et al.
2013/0303230 A1*  11/2013  Sayana ................ H04W 24/08
                                                      455/524
(Continued)

FOREIGN PATENT DOCUMENTS

CN    101094021    12/2007
CN    102857285    1/2013
(Continued)

OTHER PUBLICATIONS

PCT International Application No. PCT/KR2014/001093, Written Opinion of the International Searching Authority dated May 27, 2014, 1 page.
(Continued)

*Primary Examiner* — Jason E Mattis
(74) *Attorney, Agent, or Firm* — Lee, Hong, Degerman, Kang & Waimey

(57) ABSTRACT

A method for transmitting channel state information by a terminal comprises the step of: receiving relation information on a CSI-RS and a physical antenna from a base station by the terminal, the relation information including information on a first CSI-RS and a first physical antenna transmitting the first CSI-RS and information on a second CSI-RS and a second physical antenna transmitting the second CSI-RS; and transmitting first channel state information and second channel state information to the base station on the basis of the relation information by the terminal.

10 Claims, 15 Drawing Sheets

(56) References Cited

U.S. PATENT DOCUMENTS

| | | | | |
|---|---|---|---|---|
| 2013/0329664 A1* | 12/2013 | Kim | ............... | H04W 24/10 370/329 |
| 2014/0126667 A1* | 5/2014 | Kwun | ............... | H04B 7/0413 375/295 |
| 2014/0153526 A1* | 6/2014 | Mazzarese | ............... | H04B 7/024 370/329 |
| 2015/0016379 A1* | 1/2015 | Nam | ............... | H04B 7/0456 370/329 |
| 2015/0373736 A1* | 12/2015 | Ji | ............... | H04B 7/2621 370/330 |

FOREIGN PATENT DOCUMENTS

| | | |
|---|---|---|
| CN | 102870362 | 1/2013 |
| CN | 102938688 | 2/2013 |
| KR | 10-2010-0138261 | 12/2010 |
| KR | 10-2011-0083445 | 7/2011 |
| WO | 2011/034340 | 3/2011 |
| WO | 2012/015238 | 2/2012 |
| WO | 2012112291 | 8/2012 |
| WO | 2012/173419 | 12/2012 |
| WO | 2013109041 A1 | 7/2013 |

OTHER PUBLICATIONS

Korean Intellectual Property Office Application No. 10-2015-7025886, Office Action dated Jan. 16, 2017, 5 pages.

Alcatel-Lucent Shanghai Bell et al., "Considerations on CSI feedback enhancements for high-priority antenna configurations", 3GPP TSG-RAN WG1 #66, R1-112420, Aug. 18, 2011, 7 pages.

European Patent Office Application No. 14774853.7, Search Report dated Nov. 4, 2016, 9 pages.

State Intellectual Property Office of the People's Republic of China Application Serial No. 201480018750.X, Office Action dated Jan. 29, 2018, 8 pages.

European Patent Office Application Serial No. 14774853.7, Office Action dated Feb. 14, 2018, 10 pages.

3rd Generation Partnership Project (3GPP), "Technical Specification Group Radio Access Network; Evolved Universal Terrestrial Radio Access (E-UTRA); Radio Resource Control (RRC); Protocol specification (Release 10)," 3GPP TS 36.331 V10.2.0, Jun. 2011, 294 pages.

Alcatel-Lucent et al., "Multiplexing and Compression of Periodic CSI Feedback for CoMP", 3GPP TSG RAN WG1 Meeting #70bis, R1-124415, Oct. 2012, 7 pages.

* cited by examiner

METHOD AND APPARATUS FOR ACQUIRING CHANNEL STATE INFORMATION IN ANTENNA ARRAY

CROSS-REFERENCE TO RELATED APPLICATIONS

This application is the National Stage filing under 35 U.S.C. 371 of International Application No. PCT/KR2014/001093, filed on Feb. 10, 2014, which claims the benefit of U.S. Provisional Application No. 61/805,934, filed on Mar. 28, 2013, the contents of which are all hereby incorporated by reference herein in their entirety.

BACKGROUND OF THE INVENTION

Field of the Invention

The present invention relates to wireless communication, and more particularly, to an antenna array.

Related Art

In recent years, with an increase in demand for next-generation mobile communication and mass data communication, high-quality high-speed multimedia communication services have been gradually required. In particular, a next-generation mobile communication system has aimed at providing a high-speed link service among a base station and multiple users. Further, with the development of a digital image media technology and an increase in demand for high-speed radio transmission, global technological developed counties primarily make an attempt to realize several (giga bit per second (Gbps) class radio transmission in indoor/outdoor high-speed radio data communication. This means that a beamforming system that tracks a desired signal at a high speed and has a high gain between communications are gradually required.

Beam forming is an antenna technology in which energy radiated from an antenna is concentrated on a specific direction in space. A purpose of the beam forming is to receive a signal having a higher intensity from a desired direction or transfer a signal having more concentrated energy in the desired direction. In particular, the beam forming system is required to implement various forms of beams having a high gain for achieving the high speed and a large capacity of the wireless communication system.

For example, the beam forming system can be used for communications in a band having high pass loss, such as high-speed transceiving communication of mass data, various satellite air communications using a smart antenna in a satellite, aviation, and the like, and the like. Accordingly, beam forming communications have been researched in various fields including a next-generation mobile communication, various radar, military and aerospace communications, indoor and inter-building high-speed data communications, a wireless local area network (WLAN), a wireless personal area network (WPAN), and the like.

SUMMARY OF THE INVENTION

The present invention provides a method for acquiring channel state information in an antenna array.

The present invention also provides an apparatus for acquiring channel state information in an antenna array.

In one aspect, a method for transmitting channel state information by a terminal includes: receiving relation information on a CSI-RS and a physical antenna from a base station by the terminal, the relation information including information on a first CSI-RS and a first physical antenna transmitting the first CSI-RS and information on a second CSI-RS and a second physical antenna transmitting the second CSI-RS; and transmitting first channel state information and second channel state information to the base station on the basis of the relation information by the terminal, wherein the first physical antenna and the second physical antenna may be included in one antenna array, the first channel state information may be information on a channel state between the terminal and the first physical antenna determined on the basis of the first CSI-RS, and the second channel state information may be information on a channel state between the terminal and the second physical antenna determined on the basis of the second CSI-RS.

In another aspect, a terminal which operates in a wireless communication network includes: a radio frequency (RF) unit implemented to transmit and receive a radio signal; and a processor selectively connected with the RF unit, wherein the processor is implemented to receive relation information on a CSI-RS and a physical antenna from a base station, the relation information including information on a first CSI-RS and a first physical antenna transmitting the first CSI-RS and information on a second CSI-RS and a second physical antenna transmitting the second CSI-RS, and transmit first channel state information and second channel state information to the base station on the basis of the relation information, wherein the first physical antenna and the second physical antenna are included in one antenna array, the first channel state information is information on a channel state between the terminal and the first physical antenna determined on the basis of the first CSI-RS, and the second channel state information is information on a channel state between the terminal and the second physical antenna determined on the basis of the second CSI-RS.

In an antenna array including a plurality of physical antennas such as massive multiple input multiple output (MIMO), channel state information of each physical antenna can be effectively acquired.

DESCRIPTION OF EXEMPLARY EMBODIMENTS

User equipment (UE) may be fixed or movable and may be called other terms such as a mobile station (MS), a mobile terminal (MT), a user terminal (UT), a subscriber station (SS), a wireless device, a personal digital assistant (PDA), a wireless modem, a handheld device, and the like.

A base station generally represents a fixed station that communicates with the UE and may be referred to as other terms such as an evolved-NodeB (eNB), a base transceiver system (BTS), and an access point.

Figure 1:
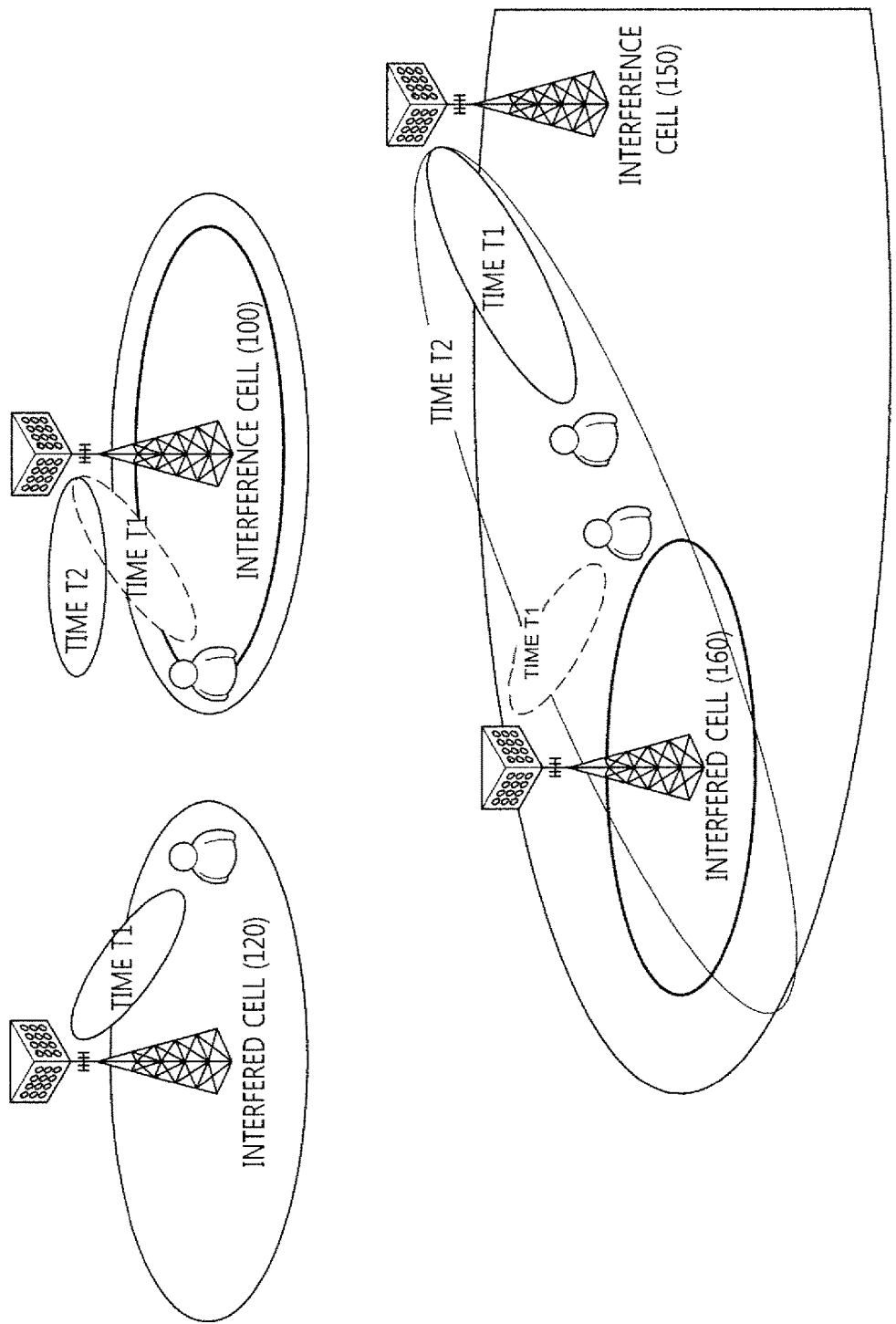
FIG. 1 is a conceptual diagram illustrating an enhanced inter-cell interference cancellation (eICIC) technique.

FIG. 1 is a conceptual diagram illustrating an enhanced inter-cell interference cancellation (eICIC) technique.

In FIG. 1, disclosed is a method for distributing/avoiding interference by differently allocating transmission power in a time domain for each cell in the enhanced inter-cell interference cancellation (eICIC) technique. The eICIC technique is a 3GPP LTE-A Rel-10 applied technique.

Referring to FIG. 1, as a method for removing inter-cell interference in the time domain, transmission power of an interference cell may be differently configured in the time domain. For example, the interference cell may decrease and transmit transmission power of a specific subframe in order to reduce an interference influence on an interfered cell. The subframe having lower transmission power than a general subframe is defined as a term called an almost blank subframe (ABS). In 3GPP LTE, the interference may be reduced through a method that stipulates and transmits a configuration of the ABS with respect to a predetermined time domain. For example, a 40-bit bitmap is transmitted at a transmission cycle of 40 ms to transmit information on the configuration of the ABS from a base station to a terminal.

The terminal is allocated with two different CSI measurement subframe sets (e.g., $C_{CSI,0}$ and $C_{CSI,1}$) from a higher layer to transmit different feedback information to the base station for each CSI measurement subframe.

An upper end of FIG. 1 illustrates a case in which when the interfered cell and the interference cell are neighboring cells, the interference cell reduces transmission power at a time t1 when the interfered cell transmits a subframe to alleviate inter-neighboring cell interference.

A lower end of FIG. 1 illustrates a case in which the interference cell and the interfered cell are heterogeneous networks (HetNet). In the heterogeneous networks, small base stations having small coverage, such as micro, pico, femto cells, and the like may overlap with each other in a macro base station. At the time t1 when the micro, pico, femto cells, and the like as the interfered cell perform transmission, power used for transmission in the macro base station is reduced to reduce an interference amount generated in the interfered cell. In the case of the heterogeneous network illustrated on the lower end of FIG. 1, the macro base station shifts the terminal to an adjacent small base station based on handover or cell (re)selection according to a network load to control the network load.

However, in the eICIC method performed based on the time domain, an interference base station may have restrictions by scheduling of the terminal due to a reason other than the network load. That is, the interference base station may have restrictions at the time of scheduling the terminal in a specific subframe due to the reason (e.g., in the case of restricting the transmission power for protection of the terminal by an interfered base station in a heterogeneous network environment or cell range extension in a homogeneous network environment).

Further, on the upper end and the lower end of FIG. 1, a beam transmitted by the interference cell means that the beam is divided into the transmission power at the time domains t1 and t2 and does not mean variation of a beam direction. Further, the feedback information of the terminal is also neither explicitly separately fed back with respect to $C_{CSI,0}$ and $C_{CSI,1}$ nor simultaneously fed back. In the embodiment of the present invention, a beam subset used to transmit the specific subframe is restricted in addition to the time domain to thereby prevent interference between a neighboring cell and a shifted cell. A detailed embodiment thereof will be described below.

Figure 2:
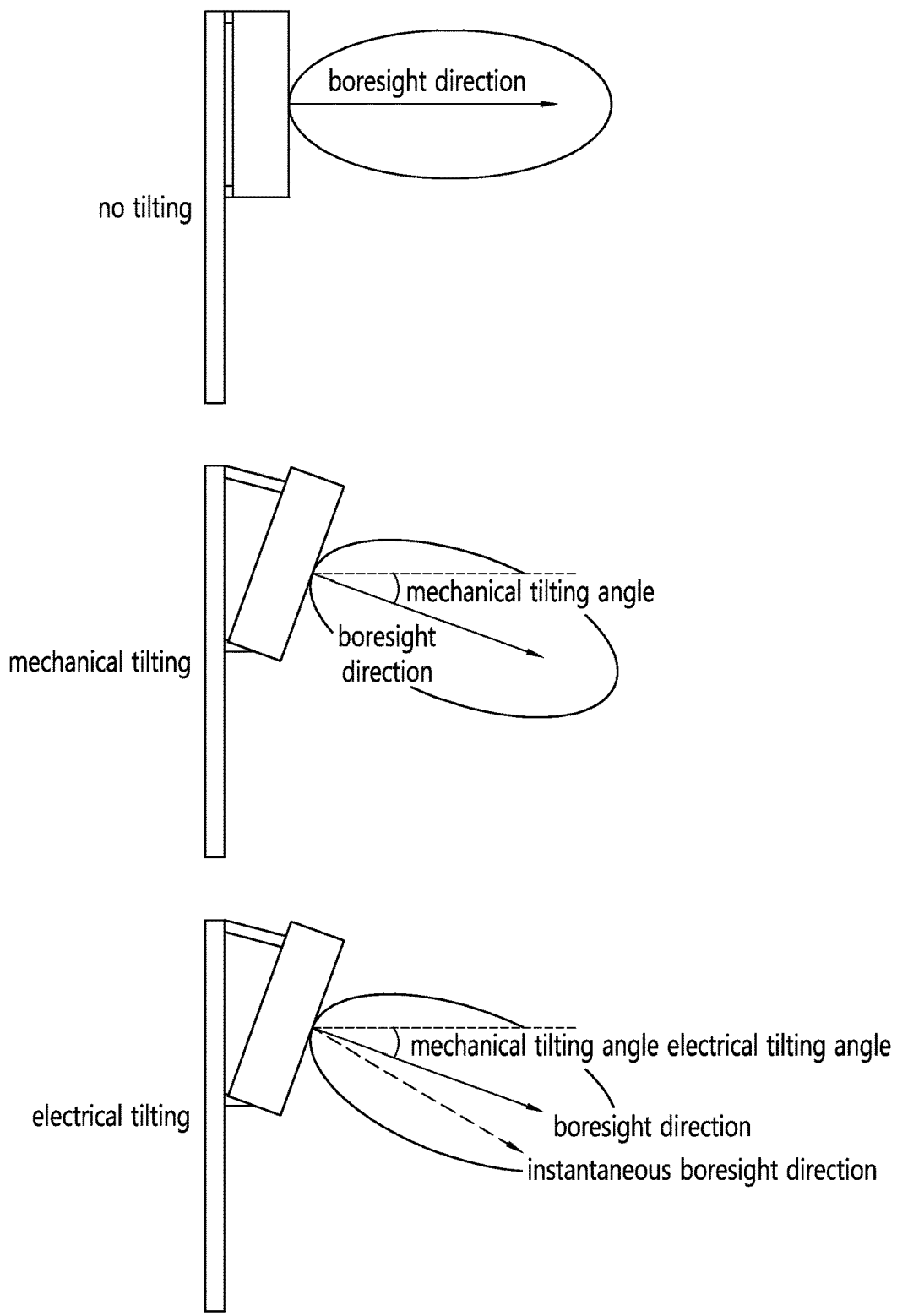
FIG. 2 is a conceptual diagram illustrating an antenna tilting method.

FIG. 2 is a conceptual diagram illustrating an antenna tilting method.

Referring to FIG. 2, in the existing cellular system, the base station has used a method for reducing the inter-cell interference based on mechanical tilting or electrical tilting and improves a signal to interference-pulse-noise ratio (SINR) of the terminals in the cell. However, in the case of the mechanical tilting, it is disadvantageous in that a direction of a beam is fixed during initial installation and since a mechanical tilting angle is determined according to the height of a building in which the base station is installed and the height of a supporter, a radiation beam width needs to be large. In the case of the electrical tilting, a tilting angle may be shifted by using an internal phase shift module, but it is actually disadvantageous in that very limited vertical beamforming is valid due to cell fixed tilting. When an active antenna system (AAS) is used, more flexible horizontal beamforming and/or vertical beamforming may be implemented than the existing tilting.

Figure 3:
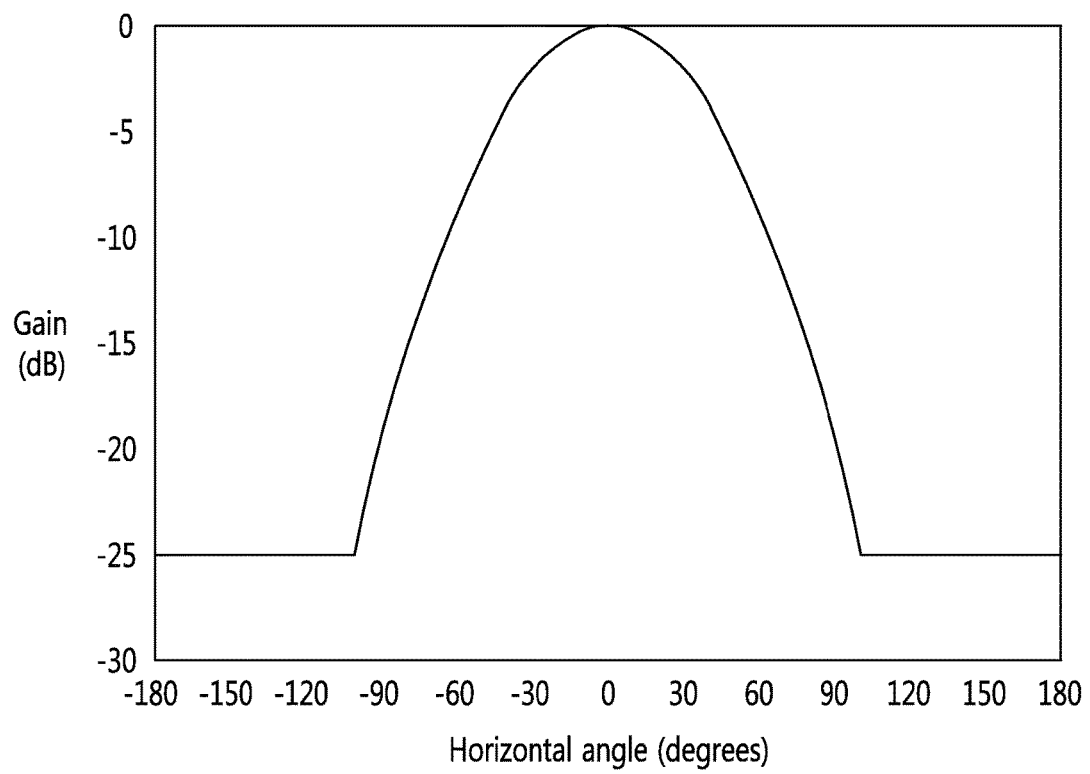
FIG. 3 illustrates a pattern of a beam generated by a base station when the existing electric tilting is considered.
Figure 3:
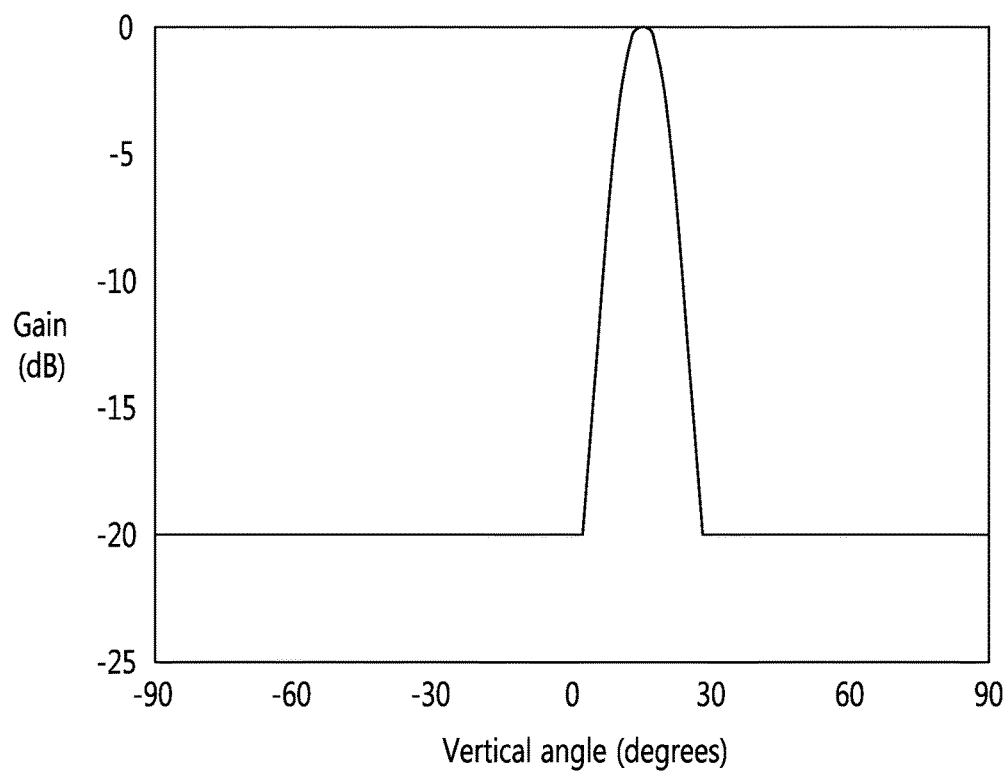

FIG. 3 illustrates a pattern of a beam generated by a base station when the existing electric tilting is considered.

A left side of FIG. 3 illustrates a general horizontal beam pattern and a right side of FIG. 3 illustrates a vertical beam pattern when it is assumed that the electrical tilting angle is 15°.

A beam characteristic of an antenna which is considered or generally known in 3GPP may have the following value. A vertical beam width may have 10 to 15° based on a half power beam width (HPBW) and a horizontal beam width may have 65 to 70° based on the HPBW. Herein, the half power beam width (HPBW) means a beam considering 3 dB gain attenuation. The HPBW may indicate a sharpness degree (sharpness) as a physical quantity representing a degree of orientation by a semi-angle. The smaller HPBW may mean the sharper orientation. When using the active antenna, the width of the beam may be larger than the pattern of the beam generated in the base station when using the electrical tilting. This will be described below in detail.

Figure 4:
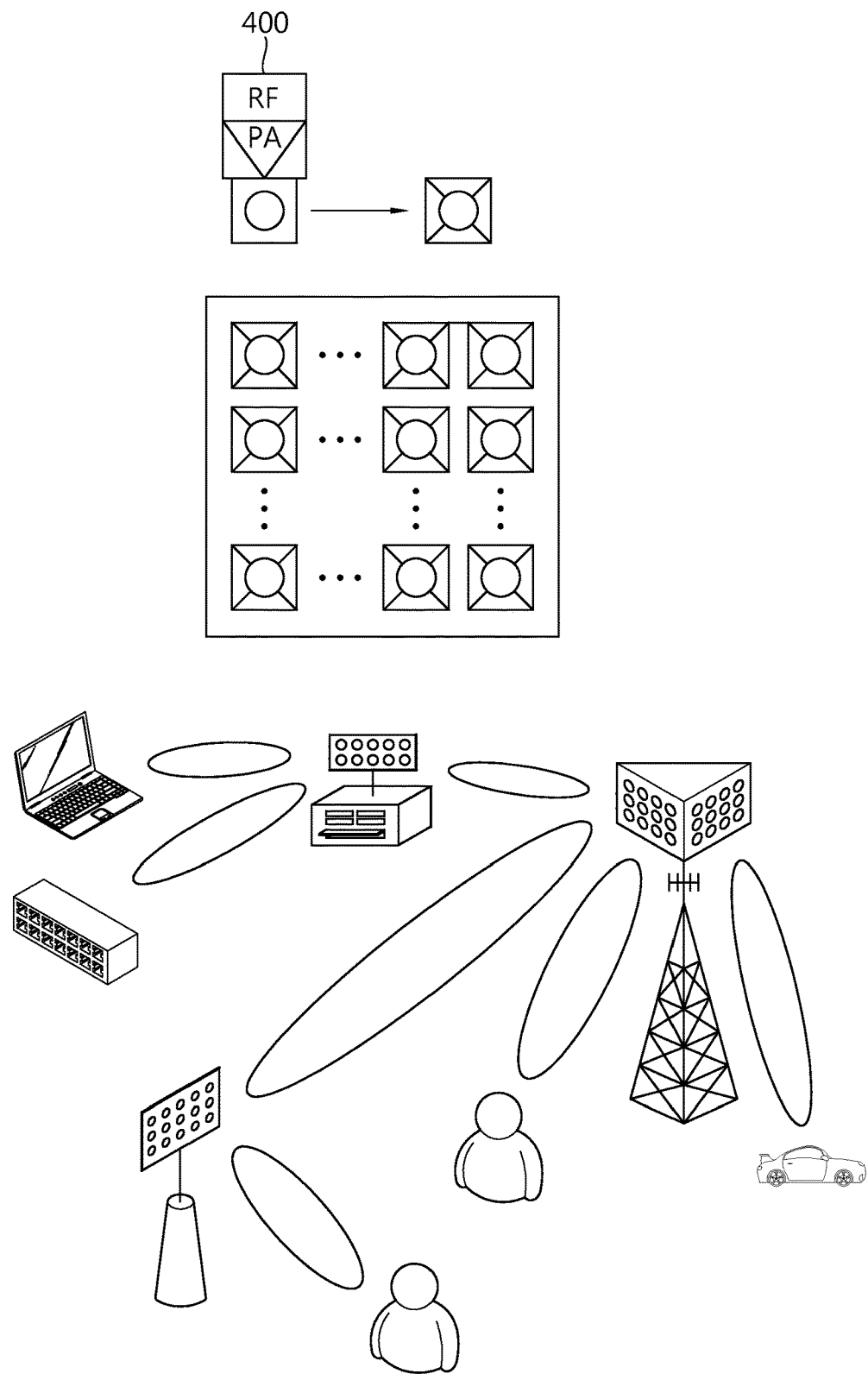
FIG. 4 is a conceptual diagram illustrating an active antenna system.

FIG. 4 is a conceptual diagram illustrating an active antenna system.

Referring to FIG. 4, the active antenna system (AAS) is an antenna system implemented in a form in which a radio frequency (RF) module is coupled to respective antennas as passive elements unlike the existing passive antenna system. Since each antenna includes the RF module, that is, an active element, the active antenna system may control power and a phase for each antenna module. The active antenna system may enhance matters (an increase of an effective length of a small antenna, an increase of a bandwidth, a decrease of mutual coupling among array elements, enhancement of a noise component, an increase in transmission power efficiency, and the like) associated with antenna performances, and may be highly integrated in association with microwave integrated circuit (MIC) and monolithic microwave integrated circuit (MMIC) technologies and in particular, overcome a disadvantage caused by high loss by a transmission line, limited source power, a decrease in antenna efficiency, and absence of a phase shifter having excellent performance. Since the RF module is coupled to each antenna, the antenna may be controlled for each port, the phase and an output of the antenna may be controlled according to a communication environment and a situation.

A lower end of FIG. 4 discloses is a method for transmitting a terminal specific beam based on the active antenna. Referring to a lower end of FIG. 3, when the active antenna is used, the direction of the beam is controlled to a relevant direction with respect to a specific target to control the power based on the position of the relevant target, thereby performing beamforming with respect to the target.

Figure 5:
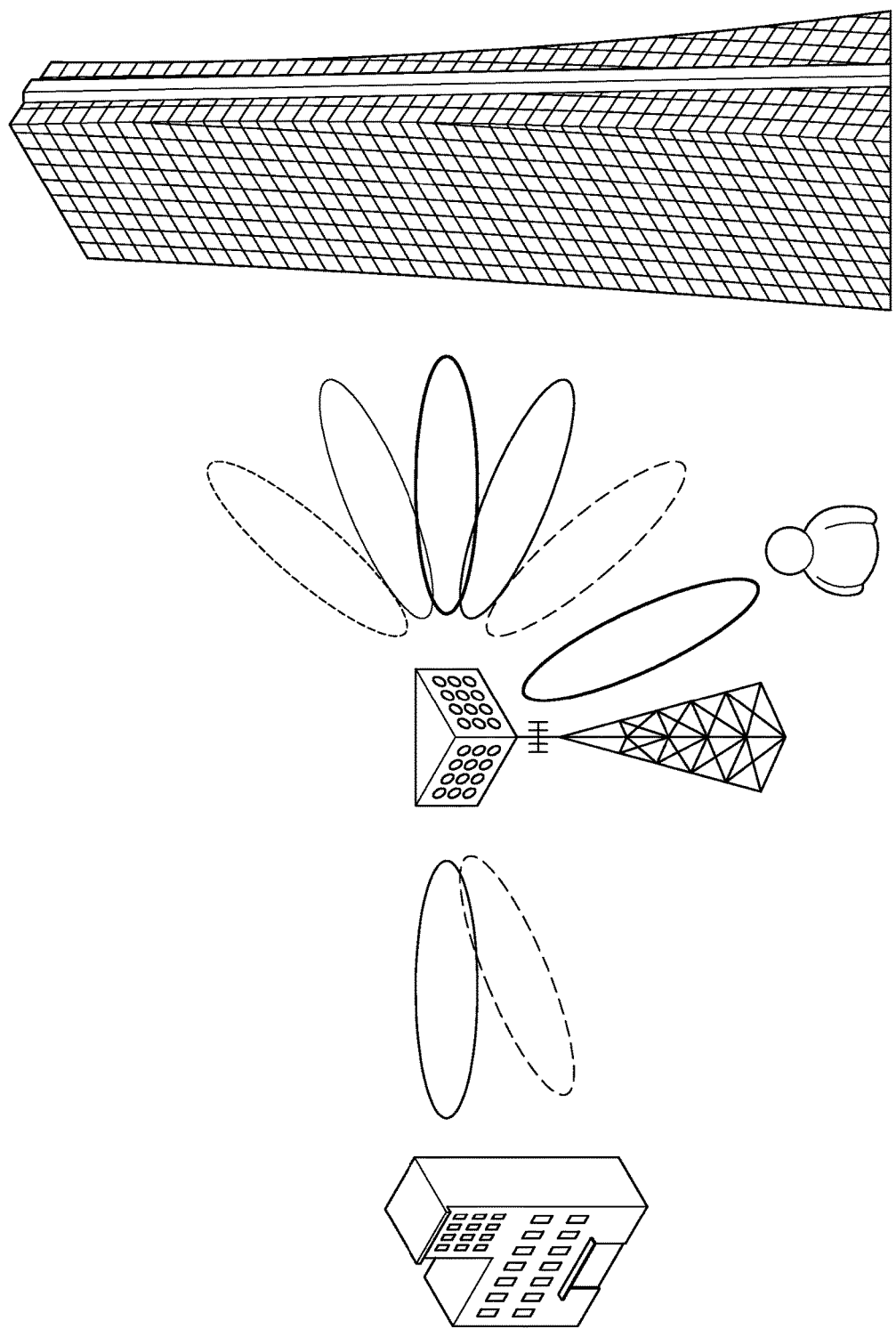
FIG. 5 is a conceptual diagram illustrating a method for transmitting an active antenna based terminal specific beam.

FIG. 5 is a conceptual diagram illustrating a method for transmitting an active antenna based terminal specific beam.

In FIG. 5, a method for transmitting the terminal specific beam based on a 2D active antenna array is disclosed.

As a transmission environment using a 2D antenna array based on the active antenna, an environment (outdoor to indoor (O2I)) in which the beam is transmitted from an external base station to an outdoor terminal and an outdoor small-cell environment (urban micro) are primarily considered.

Referring to FIG. 5, when the beam is transmitted by using the active antenna based 2D antenna array, the base station may achieve terminal specific horizontal beam steering and vertical beam steering considering various terminal heights according to a building height to be used in an actual cell environment in which various multiple buildings exist in the cell.

The cell environment in which multiple buildings having various heights exist in the cell may be considered. In this case, channel characteristics significantly different from the existing radio channel environment may be considered. For example, the beam may be steered by considering fading characteristic changes including a shadow/path loss according to a height difference, line of sight (LoS)/non line of sight (NLoS), direction of arrival (DoA), and the like.

In an LTE system, a purpose of a downlink pilot or reference signal (RS) may be generally classified as below. As a measurement reference signal, a reference signal for measuring a channel state may be used. The measurement reference signal may be used for CSI measurement or reporting by performing measurement during a short period. The measurement reference signal may be used for performing link adaptation, rank adaptation, and close loop MIMO precoding.

Further, the measurement reference signal may be used for measurement or reporting during a long period. For example, the handover, the cell selection/reselection, and the like may be performed based on the measurement reference signal.

Further, as the downlink RS, a demodulation RS used for demodulating a physical channel, a positioning reference signal for estimating the position of the terminal, and a multicast broadcast single frequency network (MBSFN) RS which is a reference signal for multicast and/or broadcast service may be used.

In LTE release 8, a cell-specific RS (CRS) is sued for measurement (purpose 1A/B) and demodulation (purpose 2) for most downlink physical channels, but a CSI-RS may be used exclusively for the CSI measurement (purpose 1A) from LTE advanced (Rel-10) and a URS (UE-specific RS) may be used for the purpose (purpose 2) for demodulating a downlink data channel (PDSCH) in order to solve an RS overhead problem caused by an increase in number of antennas.

The CSI-RS as an RS designed exclusively for CSI measurement and feedback has still lower RS overhead than the CRS and the CRS is designed to support at most 4 multiple antenna ports, while the CSI-RS is designed to support 8 multiple antenna ports. A URS is a precoded RS designed exclusively for the demodulating the data channel and similarly adopted with an MIMO precoding technique applied at the time of transmitting data to the corresponding terminal unlike the CRS. Accordingly, the URS needs to be transmitted as many as the antenna ports like the CRS and the CSI-RS and is just transmitted only as many as transmission layers or transmission ranks. Further, since the URS is transmitted for receiving the data channel of the corresponding terminal to a resource area which is the same as a data channel resource area allocated to each terminal through a scheduler of the base station, the URS is the terminal specific RS. Since the CRS is continuously used in the same pattern within a system bandwidth so that all terminals in the cell are used for measurement and demodulation, the CRS is a cell-specific reference signal.

Hereinafter, the CRS, CSI-RS, and the URS associated with measurement and demodulation among LTE downlink reference signals will be described in detail.

Figure 6:
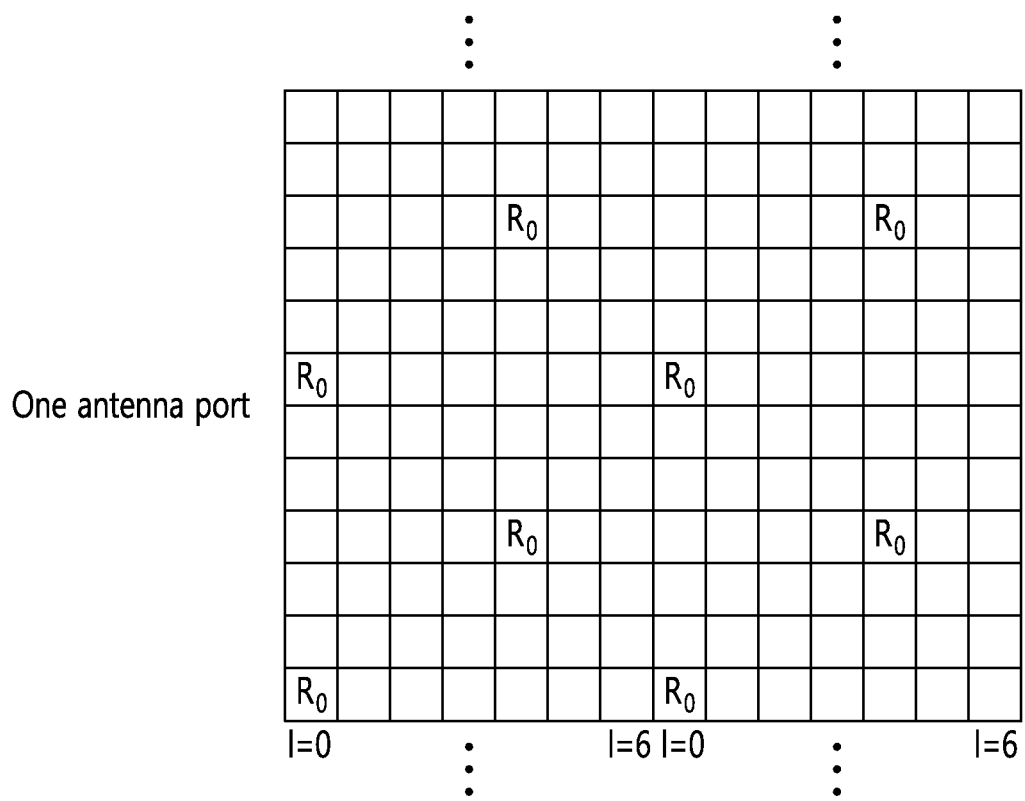
FIG. 6 is a conceptual diagram of allocating a resource element corresponding to a CRS in a resource block pair.

FIG. 6 is a conceptual diagram of allocating a resource element corresponding to a CRS in a resource block pair.

In FIG. 6, a CRS resource defined in one antenna port is disclosed for easy description.

The CRS is disclosed in Section 6.10.1 of 3GPP TS 36.211 V11.1.0. The CRS is transmitted through antenna ports 0 to 3 in all downlink subframes of a cell supporting PDSCH transmission and supports only Δf=15 kHz.

$\eta_{n_s}^{(m)}$, Pseudo-random sequence generated in a seed value based on a cell ID may be resource-mapped to $\alpha_{k,l}^{(p)}$, a complex valued modulation symbol modulated with a complex value. Where, $n_s$ represents the slot number in one radio frame and p represents the antenna port. l as the OFDM symbol number in the slot is determined according to the antenna port as shown in Equation 1 given below and k as a subcarrier index has 6 converted indexes according to the cell ID as shown in Equation 2.

$$l = \begin{cases} 0, N_{symb}^{DL} - 3 & \text{if } p \in \{0, 1\} \\ 1 & \text{if } p \in \{2, 3\} \end{cases} \quad \langle \text{Equation 1} \rangle$$

$$k = 6m + (v + v_{shift}) \bmod 6, \, v_{shift} = N_{ID}^{cell} \bmod 6 \quad \langle \text{Equation 2} \rangle$$

Resource elements (RE) allocated to the CRS of one antenna port may not be used for transmission in another antenna port and need to be set to zero. In an MBSFN subframe, the CRS is transmitted only in a non-MBSFN area of the MBSFN subframe.

Figure 7:
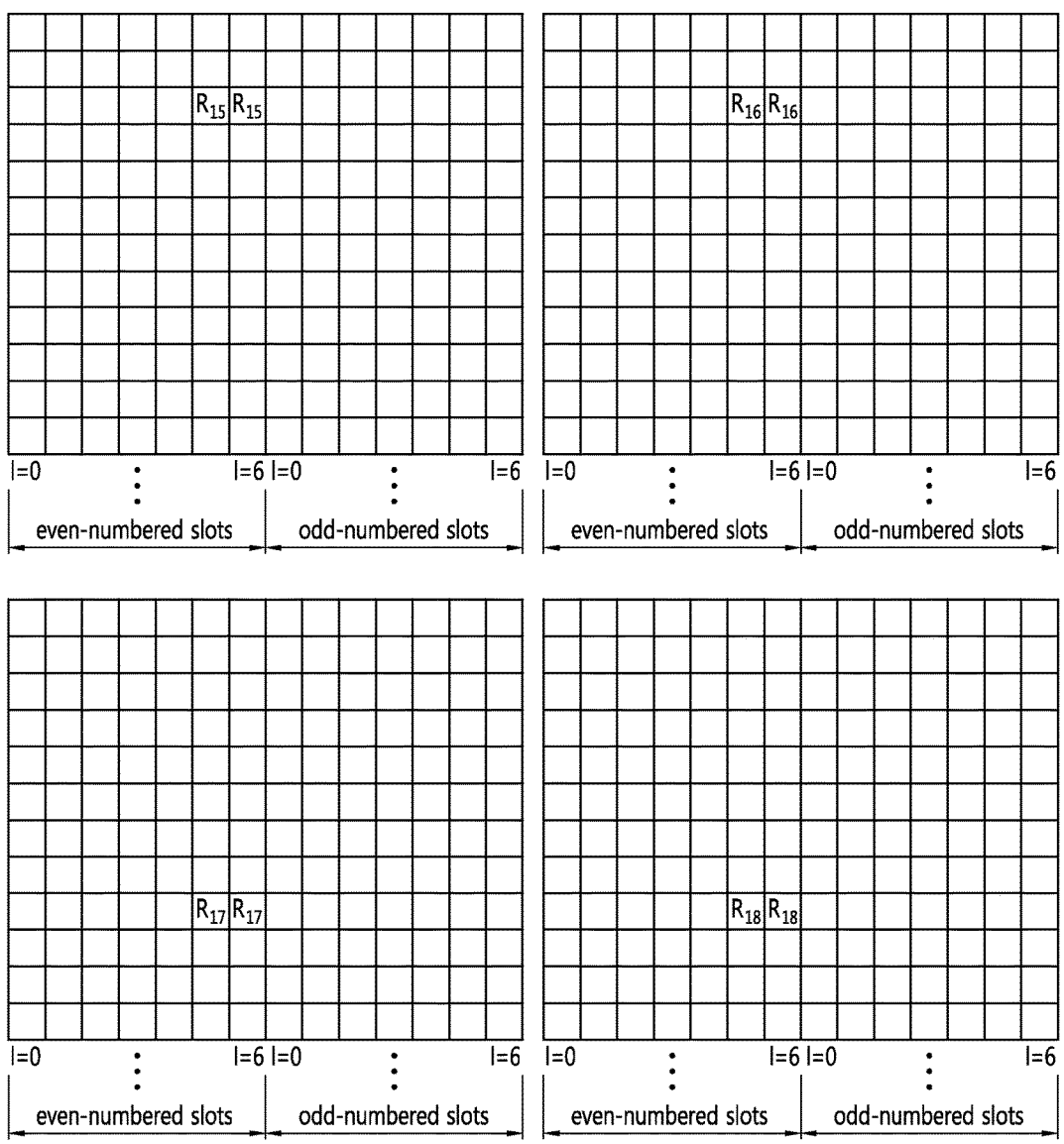
FIG. 7 is a conceptual diagram of allocating a resource element corresponding to a CSI-RS in one resource block pair.

FIG. 7 is a conceptual diagram of allocating a resource element corresponding to a CSI-RS in one resource block pair.

In FIG. 7, resource mapping for 0 to which the CSI-RS is set is illustrated. In FIG. 7, mapping of the CSI-RSs defined in antenna port Nos. 15 to 18 is illustrated. CSI-RSs defined in antenna port Nos. 19 to 22 are similar to each other in time axis position, however, may be mapped to a lower position by one subcarrier position on a frequency axis position.

Referring to FIG. 7, the CSI-RS supports 1, 2, 4, and 8 antenna ports based on the antenna port number (p=15 to 22) and is defined only in Δf=15 kHz.

$\eta_{,n_s}^{(m)}$, Pseudo-random sequence generated in the seed value based on the cell ID may be resource-mapped to $\alpha_{k,l}^{(p)}$, the complex valued modulation symbol modulated with the complex value. Where, $n_s$ represents the slot number in one radio frame and p represents the antenna port. l as the OFDM symbol number in the slot is determined according to the antenna port as shown in Equation 4 given below according to a configuration index of Table 1 given below and k as the subcarrier index is determined as shown in Equation 3 according to the antenna port. Only a case in which a normal CP is disclosed for easy description.

$$k = k' + 12m + \begin{cases} -0 & \text{for } p \in \{15, 16\}, \\ & \text{normal cyclic prefix} \\ -6 & \text{for } p \in \{17, 18\}, \\ & \text{normal cyclic prefix} \\ -1 & \text{for } p \in \{19, 20\}, \\ & \text{normal cyclic prefix} \\ -7 & \text{for } p \in \{21, 22\}, \\ & \text{normal cyclic prefix} \end{cases} \quad \langle\text{Equation 3}\rangle$$

$$l = l' + \begin{cases} l'' & CSI \text{ reference signal configurations } 0-19, \\ & \text{normal cyclic prefix} \\ 2l'' & CSI \text{ reference signal configurations } 20-31, \\ & \text{normal cyclic prefix} \end{cases} \quad \langle\text{Equation 4}\rangle$$

In one cell, several CSI-RS configurations may be used. That is, a non-zero power (NZP) CSI-RS may use 0 or one configuration and a zero-power (ZP) CSI-RS may use 0 or a plurality of configurations.

In the case of the ZP CSI-RS, 16 types corresponding to four antenna ports are represented by a bitmap of 16 bits in Table 1 and each bit is set to '1' to perform various configurations. The bitmap is indicated in ZeroPowerCSI-RS of a higher layer. However, resource elements which are configured as the NZP CSI-RS are excluded. A most significant bit (MSB) as a lowest CSI-RS configuration index indicates an ascending-order configuration index in the order of the bits.

In the following case, it is assumed that the terminal does not transmit the CSI-RS.

In frame structure type 2, in the case of a special subframe, when the CSI-RS is a subframe which collide with synchronization signals, a physical broadcast channel (PBCH), and SystemInformationBlockType1 messages, it may be assumed that the terminal does not transmit the CSI-RS in a subframe in which a paging message is transmitted.

S={15}, S={15,16}, S={17,18}, S={19,20} In S, a set of S={15}, S={15,16}, S={17,18}, or S={19,20}, a resource element in which the CSI-RS of one antenna port is transmitted is not used for transmitting the PDSCH or the CRI-RS of another antenna port.

$I_{CSI-RS}$, a subframe configuration of the CSI-RS is indicated on the higher layer and the subframe configuration and a subframe offset value of the CSI-RS are notified as shown in Table 2 given below. Table 2 given below shows the

TABLE 1

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | | subframe configuration of the CSI-RS for a CSI subframe configuration, a CSI-RS cycle, and the subframe offset value of the CSI-RS.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Table 3 given below shows a message configuration of the higher layer for the CSI-RS configuration.

TABLE 3

```
--ASN1START
CSI-RS-Config-r10 ::=   SEQUENCE {
    csi-RS-r10                                    CHOICE {
        release                                        NULL
        setup                                          SEQUENCE {
            antennaPortsCount-r10                      ENUMERATED {an1, an2, an4, an8},
            resourceConfig-r10                         INTEGER (0..31),
            subframeConfig-r10                         INTEGER (0..154),
            p-C-r10                                                                    INTEGER (-8..15)
        }
    }                                                                                  OPTIONAL                      -- Need ON
    zeroTxPowerCSI-RS-r10               CHOICE {
        release                                        NULL
        setup                                          SEQUENCE {
            zeroTxPowerResourceConfigList-r10          BIT STRING (SIZE 16)),
            zeroTxPowerSubframeConfig-r10              INTEGER (0..154)
        }
    }                                                                                  OPTIONAL                      -- Need ON
}
-- ASN1STOP
```

| CSI-RS-Config field descriptions |
|---|
| antennaPortsCount |
| Parameter represents the number of antenna ports used for transmission of CSI reference signals where an1 corresponds to 1, an2 to 2 antenna ports etc. see TS 36.211 [1, 6.10.5]. |
| p-C |
| Parameter: $P_c$, see TS 36.213 [3, 7.2.5]. |
| resourceConfig |
| Parameter: CSI reference signal configuration, see TS 36.211 [1, table 6.10.5.2-1 and 6.10.5.2-2]. |
| subframeConfig |
| Parameter: $I_{CSI-RS}$, see TS 36.211 [1, table 6.10.5.3-1]. |
| zeroTxPowerResourceConfigList |
| Parameter: ZeroPowerCSI-RS, see TS 36.211 [1, 6.10.5.2]. |
| zeroTxPowerSubframeConfig |
| Parameter: $I_{CSI-RS}$, see TS 36.211 [1, table 6.10.5.3-1]. |

A coordinated multi-point (CoMP) means an inter-point cooperative communication technique. In a multi-cell multi distribution node system, the CoMP is applied to reduce the inter-cell interference and in a single-cell multi distribution node system, intra-cell inter-point interference may be reduced. When the CoMP is used, the terminal may be commonly supported with data from multi points. Further, respective base station may simultaneously support one or more terminals by using the same radio frequency resource in order to improve the performance of the system.

In addition, the base station may perform a space division multiple access (SDMA) method based on state information on a channel between the base station and the terminal.

A primary purpose of the CoMP is to enhance communication performances of terminals on a cell boundary or a point boundary. In LTE, the CoMP method may be generally classified into a scheduling method coordinated with joint processing (JP) and/or coordinated scheduling/coordinated beamforming (CS/CB).

In the joint processing, data on the terminal may be transmitted while being shared by one or more points. The CS/CB method is a method in which data may be transmitted only in one serving point due to a problem such as a limited backhaul capacity, or the like, but other point(s) cooperate with the serving point for scheduling or reducing interference of a transmission beam.

The joint processing method may include joint transmission (JT), dynamic point selection, and the like as described below.

In the joint transmission, the same data may be transmitted to a single terminal or a plurality of terminals from a plurality of joints ( ) in a time-frequency resource. The data transmitted to the terminal may improve the quality and a data throughput of a signal simultaneously transmitted from the plurality of points.

In the dynamic point selection or muting, data may be transmitted from one point in a CoMP cooperation set in the time-frequency resource. A transmission/muting point may be changed from one subframe to the other subframe or changed in a resource block pair (RBP) in one subframe. Data are simultaneously available at the plurality of points. The dynamic point selection may include dynamic cell selection (DCS).

Further, the CS/CB technique includes even a semi-static point selection (SSPS) technique.

The SSPS is transmission from one point to a specific terminal at a specific time. The transmission point may be changed only in a semi-static method.

A CoMP cooperation set, CoMP transmission point(s), and a CoMP measurement set may be defined as described below in association with a CoMP operation.

The CoMP cooperation set as a set of points may be a set which directly and/or indirectly participates in data transmission to the terminal in the time-frequency resource. In the direct participation, data is actually transmitted and in the indirect participation, as a coordinate point for the data transmission, data is not transmitted, the points participate in determining user scheduling/beamforming.

The CoMP transmission point may be a point or a set of points for transmitting data to the terminal. The CoMP transmission point is a subset of the CoMP cooperation set. In the joint transmission, the CoMP transmission point may include the plurality of points in the CoMP cooperation set. In the CS/CB and the DPS, one point in the CoMP cooperation set is the CoMP transmission point.

The CoMP measurement set may be a set in which the channel state in formation is measured and/or reported in a link with the terminal.

When a plurality of base stations transmit data by using the CoMP, a plurality of CSI-RS patterns (resource and process) may be configured.

From LTE release 11, the plurality of CSI-RS patterns (resource and process) may be configured to the single terminal through a higher layer message in order to support the CoMP operation. Referring to PhysicalConfigDedicated IE given below, multiple non-zero-power (NZP) CSI-RSs, ZP CSI-RSs, CSI-interference measurement (IM) resources, and CSI processes may be configured. The multiple CSI processes (one CSI process is constituted by the NZP CSI-RS and the CSI-IM resource) may be configured to a release 11 terminal based on the configuration information. In general, since one CSI process corresponds to one CoMP transmission mode (e.g., point A transmission, point B transmission, and joint transmission of point A and point B), the CoMP operation may be supported by configuring the multiple CSI processes.

Table 4 given below shows PhysicalConfigDedicated IE (information element) disclosed in 3GPP TS 36.331 V11.2.0, Table 5 shows CSI-process information element (IE) disclosed in 3GPP TS 36.331 V11.2.0, and Table 6 shows CSI-RS-ConfigNZP information element (information element) disclosed in 3GPP TS 36.331 V11.2.0.

TABLE 4

```
-- ASN1START
PhysicalConfigDecticated ::=           SEQUENCE {
    pdsch-ConfigDedicated                      PDSCH-ConfigDedicated                   OPTIONAL,
        -- Need ON
    pucch-ConfigDedicated                      PUCCH-ConfigDedicated                   OPTIONAL,
        -- Need ON
    pusch-ConfigDedicated                      PUSCH-ConfigDedicated                   OPTIONAL,
        -- Need ON
    UplinkPowerControlDedicated                UplinkPowerControlDedicated             OPTIONAL,
    -- Need ON
    tpc-PDCCH-ConfigPUCCH                      TPC-PDCCH-Config
    OPTIONAL                -- Need ON
    tpc-PDCCH-ConfigPUSCH                      TPC-PDCCH-Config
    OPTIONAL,               -- Need ON
    cqi-ReportConfig                           CQI-ReportConfig
    OPTIONAL                -- Corrd CQI-r8
    soundingRS-ULConfigDedicated               SoundingRS-UL-ConfigDedicated           OPTIONAL, -- Need ON
    (omitted)
    [[          antennaInfoDedConfigToReleaseList-r11      AntennaInfoDedConfigToReleaseList-r11    OPTIONAL, -- Need ON
                antenneInfoDedConfigToAddModList-r11       AntennaInfoDedConfigToAddModList-r11     OPTIONAL, -- Need ON
                cqi-ReportConfig-v11x0                     CQI-ReportConfig-v11x0
    OPTIONAL               -- Need ON
                cqi-ReportPeriodicExtToReleaseList-r11     CQI-ReportPeriodicExtToReleaseList-r11   OPTIONAL, -- Need ON
                cqi-ReportPeriodicExtToAddModList-r11      CQI-ReportPeriodicExtToAddModList-r11    OPTIONAL, -- Need ON
                csi-IM-ConfigToReleaseList-r11             CSHM-ConfigToReleaseList-r11             OPTIONAL,
    -- Need ON
                csi-IM-ConfigToAddModList-r11              CSHM-ConfigToAddModList-r11   OPTIONAL,              -- Need ON
                csi-ProcessToReleaseList-r11               CSI-ProcessToReleaseList-r11  OPTIONAL,              -- Need ON
                csi-ProcessToAddModList-r11                CSI-ProcessToAddModList-r11                          OPTIONAL,
    -- Need ON
                csi-RS-ConfigZPToReleaseList-r11       CSI-RS-ConfigZPToReleaseList-r11     OPTIONAL,          -- Need ON
                csi-RS-ConfigZPToAddModList-r11        CSI-RS-ConfigZPToAddModList-r11      OPTIONAL,
    -- Need ON
                csi-RS-ConfigNZPToReleaseList-r11      CSI-RS-ConfigNZPToReleaseList-r11    OPTIONAL,
    -- Need ON
                csi-RS-ConfigNZPToAddModList-r11       CSI-RS-ConfigNZPToAddModList-r11     OPTIONAL,
    -- Need ON
                epdcch-Config-r11                              EPDCCH-Config-r11
    OPTIONAL,               -- Need ON
                pdsch-ConfigDedicated-v11xy            PDSCH--ConfigDedicated-v11xy         OPTIONAL,
    -- Need ON
                pucch-ConfigDedicated-v11x0            PUCCH-ConfigDedicated-v11x0          OPTIONAL,
    -- Need ON
                pusch-ConfigDedicated-v11xy            PUSCHConfigDedicated-v11xy           OPTIONAL
    -- Need ON
                uplinkPowerControlDedicated-v11xy      Uplink PowerControlDedicated-v11xy   OPTIONAL  -- Need ON
    ]]
}
    PhysicalConfigDedicatedSCell-r10 ::=            SEQUENCE {
            (skipped Contents are similar PhysicalConfigDedicated IE)
    }
    AntennaInfoDedConfigToAddModList-r11          ::=  SEQUENCE (SIZE (1..maxAID-r11) OF AntennaInfoDedConfig-r11
    AntennaInfoDedConfigToReleaseList-r11  ::=         SEQUENCE (SIZE (1..maxAID-r11)) OF AntennaInfoDedConfigId-r11
```

TABLE 4-continued

```
CSI-IM-ConfigToAddModList-r11 ::=                SEQUENCE (SIZE (1..maxCSH-IM-r11)) OF CSI-IM-Config-r11
CSI-IM-ConfigToReleaseList-r11 ::=               SEQUENCE (SIZE (1..maxCSI-IM-r11)) OF CSI-IM-Identity-r11
CSI-ProcessToAddModList-r11 ::=                  SEQUENCE (SIZE (1 maxCSI-Prot-r11)) OF CSI-Process-r11
CSI-ProcessToReleaseList-r11 ::= SEQUENCE (SIZE (1 maxCSI-Proc-r11)) OF CSI-ProcessIdentity-r11
CSI-RS-ConfigNZPToAddModList-r11 ::=             SEQUENCE (SIZE (1 maxCSI-RS-NZP-r11)) OF CSI-RS-ConfigNZP-r11
CSI-RS-ConfigNZPToReleaseList-r11 ::=            SEQUENCE (SIZE (1.. maxCSI-RS-NZP-r11)) OF CSI-RS-IdentityNZP-r11
CSI-RS-ConfigZPToAddModList-r11 ::=              SEQUENCE (SIZE (1..maxCSI-RS-ZP-r11)) OF CSI-RS-ConfigZP-r11
CSI-RS-ConfigZPToReleaseList-r11 ::=             SEQUENCE (SIZE (1..maxCSI-RS-ZP-r11)) OF CSI-RS-IdentityZP-r11
CQI-ReportPerrodicExtToAddModList-r11 ::=        SEQUENCE (SIZE (1..maxCQI-Ext-r11)) OF CQI-ReportPeriodicExt-r11
CQI-ReportPerrodicExtToReleaseList-r11 ::=       SEQUENCE (SIZE (1..maxCQI-Ext-r11)) OF CQI-ReportPeriodicExtId-r11
-- ASN1STOP
```

TABLE 5

```
--ASN1START
CSI-Process-r11 ::=           SEQUENCE {
    csi-ProcessIdentrty-r11        CSI-ProcessIdentity-r11,
    csi-RS-IdentityNZP-r11         CSI-RS-IdentityNZP-r11,
    csi-IM-Identity-r11            CSI-IM-Identity-r11,
    p-C-AndAntennaInfoDedList-r11  SEQUENCE (SIZE (1..2)) OF P-C-AndAntennaInfoDed-r11,
    cqi-ReportBothPS-r11           CQI-ReportBothPS-r11        OPTIONAL,       -- Need OR
    cqi-ReportPeriodicId-r11       INTEGER (0..maxCQI-Ext-r11) OPTIONAL,       -- Need OR
    cqi-ReportAperiodicPS-r11      CQI-ReportAperiodicPS-r11   OPTIONAL,       -- Need OR
}
P-C-r11 ::=                   INTEGER (-8..15)
P-C-AndAntennaInfoDed-r11..=  SEQUENCE {
    p-C-r11                                                    P-C-r11,
    antennaInfoDedConfigId-r11     AntennaInfoDedConfigId-r11
}
-- ASN1STOP
```

TABLE 6

```
-- ASN1START
CSI-RS-ConfigNZP-r11 ::=      SEQUENCE {
    csi-RS-IdentityNZP-r11         CSI-RS-IdentityNZP-r11,
    antennaPortsCount-r11          ENUMERATED {an1, an2, an4, an8},
    resourceConfig-r11             INTEGER (0..31),
    subframeConfig-r11             INTEGER (0..154),
    scramblingIdentity-r11         INTEGER (0..503),
    qci-CRS-Info-r11               SEQUENCE {
        qci-ScramblingIdentity-r11     INTEGER (0..503),
        crs-PortsCount-r11                 ENUMERATED (n1, n2, n4, spare1),
        mbsfn-SubframeConfig-r11       MBSFN-SubframeConfig                OPTIONAL
     -- Need OR
    }
                                                       OPTIONAL,     -- Need OR
    ...
}
-- ASN1STOP
```

In most cellular systems including the LTE system, the terminal receives the reference signal for channel estimation from the base station to determine the channel state information (CSI). The determined CSI may be reported to the base station. The base station transmits a data signal based on the CSI information fed back from the terminal. In the LTE system, the CSI information fed back by the terminal may include channel quality information (CQI), a precoding matrix index (PMI), and a rank indicator (RI).

The CQI feedback is radio channel quality information provided to the base station for a purpose (e.g., a link adaptation purpose) for providing a guide regarding which modulation and coding scheme (MCS) is applied when the base station transmits data. When radio quality between the base station and the terminal is high, the terminal feeds back a high CQI value and the base station thus applies a relatively high modulation order and a low channel coding rate to transmit data and in an opposite case thereto, the terminal feeds back a low CQI value and the base station thus applies a relatively low modulation order and a high channel coding rate to transmit data.

The PMI feedback may include information on a precoding matrix provided to the base station for a purpose for providing a guide regarding which MIMO precoding method is to be applied when the base station installs multiple antennas. The terminal estimates a downlink MIMO channel between the base station and the terminal from the reference signal and the base station may thus transmit information regarding which precoding matrix to be applied is excellent based on the PMI feedback. In the LTE system, only linear MIMO precoding which may be expressed in matrix in a PMI configuration is considered. The base station and the terminal share a codebook constituted by multiple precoding matrixes and the respective MIMO precoding matrixes in the codebook have unique indexes. Accordingly, the terminal feeds back an index corresponding to a most preferred MIMO precoding matrix in the codebook as the PMI to minimize a feedback information amount of the terminal. The PMI value need not particularly be constituted by only one index. For example, in the LTE system, in the case were the number of transmission antenna ports is 8, only when two indexes (a first PMI and a second PMI) are joined to each other, a final 8tx MIMO precoding matrix may be configured to be derived.

The RI feedback is information is information on the number of preferred transmission layers provided to the base station for a purpose for providing a guide regarding the number of transmission layers preferred by the terminal when the base station and the terminal install multiple antennas and multi-layer transmission through spatial multiplexing is thus available. The RI has a very close relation with the PMI. The reason is that the base station needs to know which precoding is applied to the respective layers according to the number of transmission layers. In the RMI/RI feedback configuration, a PMI codebook may be configured based on the single layer transmission and thereafter, the PMI may be defined and fed back for each layer, but such a scheme has a disadvantage in that a PMI/RI feedback information amount significantly increases with an increase in the number of transmission layers. Accordingly, in the LTE system, the PMI codebook according to the number of respective transmission layers is defined. That is, N matrixes having a size of Nt×R is defined in the codebook for R-layer transmission (where R represents the number of layers, Nt represents the number of transmission antenna ports, and N represents the size of the codebook). Accordingly, in the LTE, the size of the PMI codebook is defined regardless of the number of transmission layers. Since the number R of transmission layers consequently coincides with a rank value of the precoding matrix (Nt×R matrix) when the PMI/RI is defined in such a structure, a term called a rank indicator (RI) is used.

Hereinafter, the PMI/RI used in the embodiment of the present invention is not particularly limited to meaning an index value of the precoding matrix and a rank value of the precoding matrix expressed by the Nt×R matrix like the PMI/RI in the LTE system. The PMI described in the specification indicates preferred MIMO precoding information in an MIMO precoder applicable in a transmitting point and a form of the precoder is not limited to only a linear precoder which may be expressed in matrix like the LTE system. Further, the RI described in the specification includes all feedback information indicating the number of preferred transmission layers as a broader meaning than the RI of the LTE.

The CSI information may be acquired in an entire system frequency domain or in a partial frequency domain. In particular, in a system using an orthogonal frequency division multiple access (OFDMA) technology, it may be useful to acquire and feedback the CSI information regarding the partial frequency domain (e.g., a subband) preferred for each terminal.

In the LTE system, the CSI feedback is transmitted through an uplink channel. In general, a periodic CSI feedback is transmitted through a physical uplink control channel (PUCCH) and an aperiodic CSI feedback is transmitted through a physical uplink shared channel which is an uplink data channel. In the aperiodic CSI feedback, the base station temporarily feeds back the CSI feedback information only when desiring the CSI feedback information. In the aperiodic CSI feedback, the base station triggers the CSI feedback through a downlink control channel such as a PDCCH/EPDCCH. In the LTE system, when the CSI feedback is triggered, which information the terminal needs to feedback is divided into a PUSCH CSI reporting mode as shown in Table 7 given below. The base station may previously notify to the terminal which PUSCH CSI reporting mode the terminal needs to perform the CSI feedback in based on the higher layer message.

TABLE 7

|  |  | PMI Feedback Type | |
|---|---|---|---|
|  |  | No PMI(OL, TD, single-antenna) | With PMI(CL) |
| PUSCH CQI Feedback type | wideband (wideband CQI) |  | Mode 1-2: Multiple PMI<br>RI<br>$1^{st}$ wideband CQI(4 bit)<br>$2^{nd}$ wideband CQI(4 bit) if RI > 1<br>Subband PMIs on each subband |
|  | UE Selected (subband CQI) | Mode 2-0<br>RI(only for Open loop SM)<br>Wideband CQI(4 bit) + Best-M CQI(2 bit)<br>Best-M index<br>when RI > 1. CQI of first codeword | Mode 2-2: Multiple PMI<br>RI<br>$1^{st}$ wideband CQI(4 bit) + Best-M CQI(2 bit)<br>$2^{nd}$ wideband CQI(4 bit) + Best-M CQI(2 bit) if RI > 1<br>Wideband PMI Best-M PMI<br>Best-M index |
|  | Higher layer configured (subband CQI) | Mode 3-0<br>RI(only for Open loop SM)<br>wideband CQI(4 bit) + subband CQIO2 bit)<br>When RI >1. CQI of first codeword | Mode 3-1: Single PMI<br>RI<br>$1^{st}$ wideband CQI(4 bit) + subband CQI(2 bit)<br>$2^{nd}$ wideband CQI(4 bit) + subband CQI(2 bit) if RI > 1<br>Wideband PMI |

Table 8 shows the CSI feedback through the PUCCH.

TABLE 8

|  |  | PMI Feedback Type: | |
|---|---|---|---|
|  |  | No PMI(OL, TD, single-antenna) | With PMI(CL) |
| CQI Feedback type | wideband | Mode 1-0<br>RI(only for Open-loop SM)<br>One wideband CQI(4 bit)<br>when RI > 1. CQI of first codeword | Mode 1-1<br>RI<br>Wideband CQI(4 bit)<br>wideband spatial CQI(3 bit) for RI > 1<br>wideband PMI(4 bit) |

TABLE 8-continued

| | PMI Feedback Type: | |
|---|---|---|
| | No PMI(OL, TD, single-antenna) | With PMI(CL) |
| UE Selected | Mode 2-0<br>RI(only for Open-loop SM)<br>Wideband CQI(4 bit)<br>Best-1 CQI(4 bit) in each BP<br>Best-1 indicator(L-bit label)<br>when RI > 1. CQI of first codeword | Mode 2-1<br>RI<br>Wideband CQI(4 bit)<br>Wideband spatial CQI(3 bit) for RI > 1<br>Wideband PMI(4 bit)<br>Best-1 CQI(4 bit) 1 in each BP<br>Best-1 spatial CQI(3 bit) for RI > 1<br>Best-1 indicator(L-bit label) |

The embodiment of the present invention discloses a method for transmitting the reference signal for channel estimation, which is used for using a massive multiple input multiple output (MIMO) (MIMO) transmission technology and a channel reporting method.

When the massive MIMO is performed, the CSI feedback may be extended based on the CSI-RS. Existing LTE-A transmission mode 9 may have an attribute common to the cell and transmission mode 10 may have a terminal specific attribute.

In order to apply the massive MIMO transmission technology anticipated as a representative 5 generation (G) technology, 8Tx or more physical antennas in the related art need to be operated and antenna ports as many as the operated physical antennas need to be operated in terms of the antenna port.

To this end, multiple terminal-specific CSI-RSs in existing transmission mode 10 are operated, however, like the coordinated multi point (CoMP), transmission of not CSI-RSs transmitted from different base stations, that is, CSI-RSs at different antenna ports in one base station needs to be supported. The terminal may perform the CSI feedback of CSI-RSs corresponding to different antenna ports received through the antenna array.

According to the embodiment of the present invention, in transmitting the reference signal for determining the channel state information, a full antenna transmission scheme, a partial antenna transmission scheme, and a virtualization antenna transmission scheme may be used. Hereinafter, in the embodiment of the present invention, it is described on the assumption that the reference signal transmitted in the antenna array to determine the channel state information is the CSI-RS for easy description, but the terminal measures the channel state based on a reference signal other than the CSI-RS to perform the CSI feedback.

Hereinafter, it is described on the assumption that the antenna array is 4×4 for easy description. However, the antenna array may have a size of n×m (n represents a natural number of 2 or more and m represents a natural number of 2 or more). That is, the antenna array may be divided into n vertical antenna sets and m horizontal antenna sets.

Figure 8:
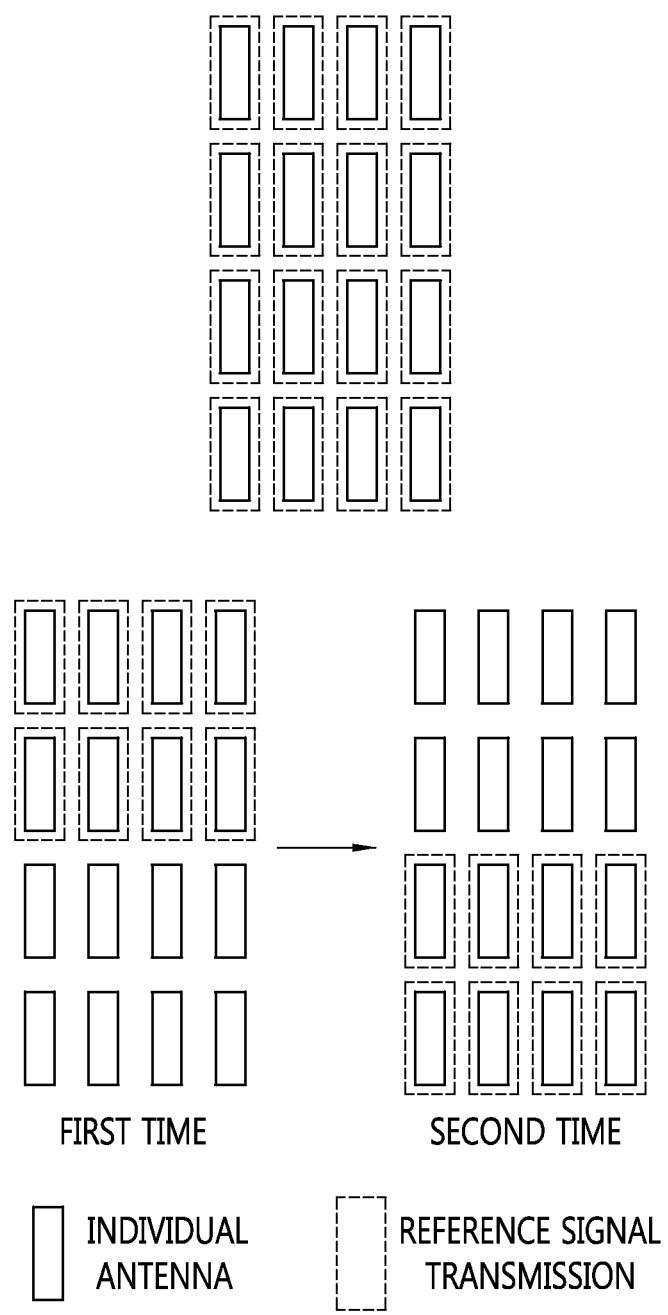
FIG. 8 is a conceptual diagram illustrating a method for transmitting a reference signal according to an embodiment of the present invention.

FIG. 8 is a conceptual diagram illustrating a method for transmitting a reference signal according to an embodiment of the present invention.

In FIG. 8, the full antenna transmission scheme among the methods for transmitting the reference signal in the antenna array is disclosed. The antenna array may include a plurality of physical antennas.

The full antenna transmission scheme is a method for transmitting the reference signal so that the terminal knows the channel state information regarding all physical antennas included in the antenna array.

For example, in the full antenna transmission scheme, multiple reference signals (e.g., CSI-RS) are transmitted at the same time to allow the terminal to know the channel information regarding all physical antennas included in the antenna array at once. In the case of the CSI-RSs transmitted in the respective physical antennas, the CSI-RSs at different antenna ports in the respective physical antennas may be configured and transmitted. The time when the physical antenna transmits the reference signal may be synchronized in the physical antennas based on information such as a configured cycle and a configured transmission frame offset. The antenna port may be used to distinguish the CSI-RSs defined in different resources.

Another full antenna transmission scheme may be implemented in such a manner that the physical antennas included in the antenna array transmit the reference signals at different time (different cycles or transmission frame offsets) to allow the terminal to know the channel information regarding all physical antennas included in the antenna array over a predetermined time interval.

An upper end of FIG. 8 illustrates a method for allocating the CSI-RSs defined in the respective antenna ports to the respective physical antennas in the array antenna and transmitting the CSI-RSs in order to transmit the multiple reference signals at the same time.

It may be assumed that the antenna array includes 16 physical antennas (first to sixteenth physical antennas) having the array of 4×4 and the antenna ports of the CSI-RSs are defined as first to eighth antenna ports. In this case, the CSI-RSs defined at the first to eighth antenna ports of the respective physical antennas included in the antenna array may be mapped to the first to sixteenth physical antennas. For example, the CSI-RSs corresponding to the first to eighth antenna ports may be mapped to the first to eighth physical antennas and the CSI-RSs corresponding to the first to eighth antenna ports may be mapped to the ninth to sixteenth physical antennas, respectively. The respective physical antennas included in the antenna array may transmit the CSI-RSs based on the mapping. The terminal may receive the CSI-RSs from the physical antenna included in the antenna array and feedback the CSI determined based on the CSI-RS to the base station.

Alternatively, when it is assumed that the CSI-RSs are defined at the first to sixteenth antenna ports, the CSI-RSs defined at the first to sixteenth antenna port may be transmitted while being mapped to the first to sixteenth physical antennas, respectively. The terminal may receive the CSI-RSs defined at different ports from all physical antennas included in the antenna array. The terminal may feedback the CSI determined based on the received CSI-RS to the base station.

A lower end of FIG. 8 discloses a method for allocating the CSI-RSs defined at the respective antenna ports at different time to the respective physical antennas in the array antenna at different time and transmitting the CSI-RSs.

For example, the CSI-RSs defined at the first to eighth antenna ports may be mapped to the first to eighth physical antennas at a first time. The CSI-RSs defined at the first to eighth antenna ports may be mapped to the ninth to sixteenth physical antennas at a second time. All of the respective physical antennas included in the antenna array may transmit the CSI-RSs defined at different antenna ports at different time based on the mapping. The terminal may determine first channel state information which is channel state information regarding the first to eighth physical antennas based on the CSI-RSs received at the first time and determine second channel state information which is channel state information regarding the ninth to sixteenth physical antennas based on the CSI-RSs received at the second time. The first channel state information determined at the first time and the second channel state information determined at the second time may be fed back to the base station as the channel state information regarding all physical antennas.

Figure 9:
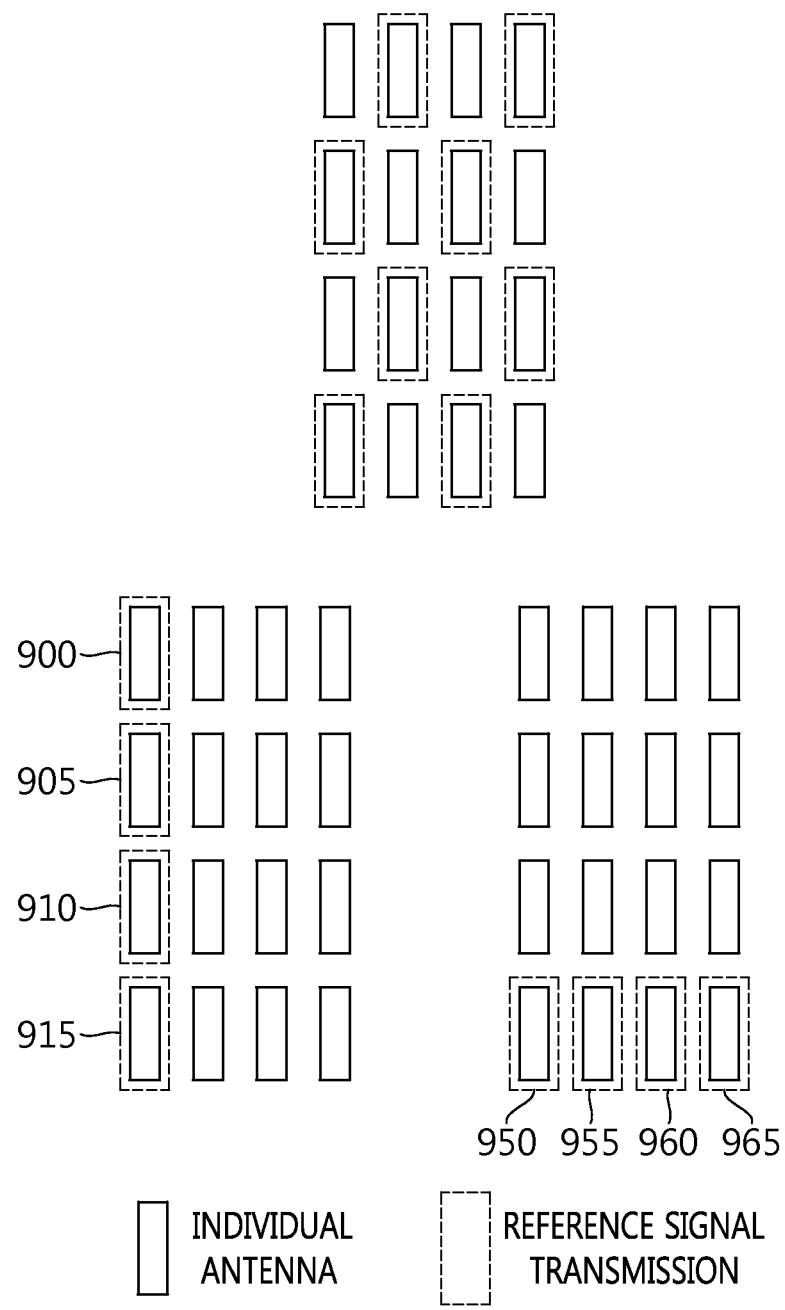
FIG. 9 is a conceptual diagram illustrating a method for transmitting a partial antenna according to an embodiment of the present invention.

FIG. 9 is a conceptual diagram illustrating a method for transmitting a partial antenna according to an embodiment of the present invention.

In FIG. 9, the channel information may be acquired through a method in which the terminal transmits the reference signal through some physical antennas among the physical antennas included in the antenna array as the partial antenna transmission scheme.

Referring to an upper end of FIG. 9, the reference signal may be transmitted through some physical antennas separated from each other by a specific antenna interval in the antenna array.

For example, the CSI-RSs defined at 8 antenna ports may be transmitted by using only 8 selected physical antennas among 16 physical antennas included in a 4×4 planar antenna array. The terminal may determine the channel state information based on the CSI-RSs transmitted through 8 selected physical antennas and transmit the determined channel state information to the base station. That is, the terminal may know only the channel state information regarding the physical antenna transmitting the CSI-RS among the physical antennas included in the antenna array. The terminal may feedback only the channel state information regarding the physical antenna transmitting the CSI-RS.

Referring to a lower end of FIG. 9, the antenna sets may be spatially divided and the CSI-RS may be transmitted in some lower antenna sets among the divided antenna sets.

For example, the 4×4 antenna array may be divided into 4 vertical antenna sets and 4 horizontal antenna sets according to an array direction of the antennas. In order to perform the partial antenna transmission, 4 physical antennas 900, 905, 910, and 915 included in one vertical antenna set among 4 vertical antenna sets may transmit the CSI-RSs defined at 4 antenna ports, respectively. For example, a CSI-RS defined at a first antenna port may be transmitted to a first physical antenna 900 among 4 physical antennas 900, 905, 910, and 915, a CSI-RS defined at a second antenna port may be transmitted to a second physical antenna 905, a CSI-RS at a third antenna port may be transmitted to a third physical antenna 910, and a CSI-RS defined at a fourth antenna port may be transmitted to a fourth physical antenna 915. Further, 4 physical antennas 950, 955, 960, and 965 included in one horizontal antenna set among 4 horizontal antenna sets may transmit the CSI-RSs defined at 4 antenna ports, respectively similarly to the vertical antenna sets.

When such a method is used, the terminal may receive the CSI-RSs defined at 4 antenna ports from 4 physical antennas 900, 905, 910, and 915 included in one vertical antenna set and receive the CSI-RSs defined at 4 antenna ports from 4 physical antennas 950, 955, 960, and 965 included in one horizontal antenna set. The terminal may determine the channel state information to be fed back to 4 physical antennas included in the vertical antenna set and 4 physical antennas included in the horizontal antenna set based on the received CSI-RSs.

The terminal may transmit the determined channel state information to the base station. The base station may determine the transmission channel state information of the antennas included in the 4×4 antenna array based on the received channel state information. For example, the base station may predict the channel state information of the physical antennas included in the 4×4 antenna array by interpolating the received channel state information.

Figure 10:
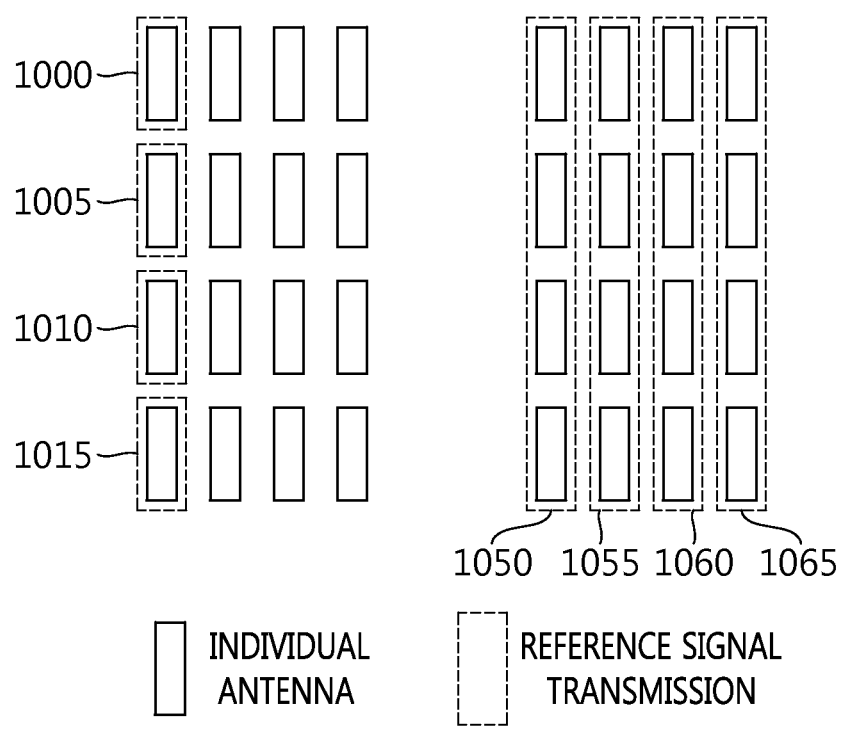
FIG. 10 is a conceptual diagram illustrating an antenna virtualization transmitting method according to an embodiment of the present invention.

FIG. 10 is a conceptual diagram illustrating a virtualization antenna transmission scheme according to an embodiment of the present invention.

Referring to FIG. 10, the base station may use the virtualization antenna transmission scheme as a method for allowing the terminal to know channel information which is inaccurate and limitative, but regarding all antennas.

In the virtualization antenna transmission scheme, the reference signals may be transmitted to some physical antennas which may show the vertical antenna set and some physical antennas which may show the horizontal antenna set, respectively with respect to two antenna sets which may be spatially divided. Information (e.g., a precoding weighted value) acquired in one antenna set of the horizontal antenna set and the vertical antenna set may be applied to transmission of the CSI-RS based on another physical antenna. The terminal may determine the channel state information to be fed back to the base station based on the reference signal transmitted based on the Information (e.g., the precoding weighted value) acquired in one antenna set of the horizontal antenna set and the vertical antenna set.

Referring to a left side of FIG. 10, the CSI-RS defined at the first antenna port may be transmitted in a first physical antenna 1000, the CSI-RS defined at the second antenna port may be transmitted in a second physical antenna 1005, the CSI-RS at the third antenna port may be transmitted in a third physical antenna 1010, and the CSI-RS defined at the fourth antenna port may be transmitted in a fourth physical antenna 1015.

Referring to a right side of FIG. 10, 4 vertical antennas may be allocated to each of the horizontal antenna sets. The CSI-RS defined at the first antenna port may be transmitted to 4 vertical physical antennas included in the first horizontal antenna set 1050, the CSI-RS defined at the second antenna port may be transmitted to 4 vertical physical antennas included in the second horizontal antenna set 1055, the CSI-RS defined at the third antenna port may be transmitted to 4 vertical physical antennas included in the third horizontal antenna set 1060, and the CSI-RS defined at the fourth antenna port may be transmitted to 4 vertical physical antennas included in the fourth horizontal antenna set 1065. That is, the reference signal defined at one antenna port may be transmitted while being allocated to the physical antennas included in the horizontal antenna set at the time of transmitting the reference signal with respect to the horizontal antenna set.

As illustrated at the left side of FIG. 10, the information (e.g., the precoding weighed value information) acquired based on the CSI-RSs transmitted in the first to fourth physical antennas 1000, 1005, 1010, and 1015 may be used while being applied at the time of transmitting data based on the first to fourth horizontal antenna sets 1050 to 1065 as illustrated in FIG. 10.

In FIG. 10, as one example, the precoding weighted value information may be acquired based on the reference signals transmitted based on 4 physical antennas positioned in a horizontal direction opposite thereto. The acquired precoding weighted value information may be used while being applied to 4 horizontal physical antennas included in the vertical antenna set at the time of transmitting the reference signal with respect to the vertical antenna set.

Figure 11:
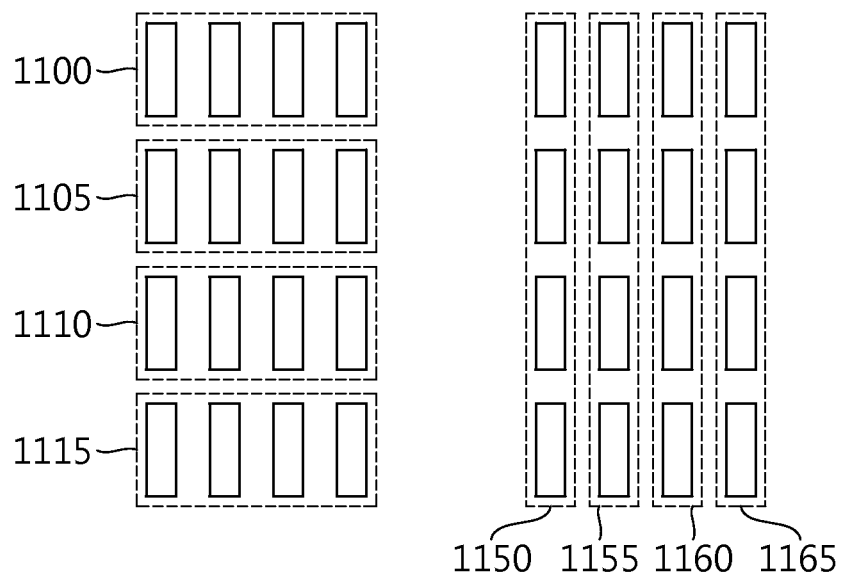
FIG. 11 is a conceptual diagram illustrating an antenna virtualization transmitting method according to an embodiment of the present invention.

FIG. 11 is a conceptual diagram illustrating a virtualization antenna transmission scheme according to an embodiment of the present invention.

A left side of FIG. 11 illustrates a method for transmitting CSI-RSs defined at different antenna ports to respective vertical antenna groups 1100, 1105, 1110, and 1115 by configuring 4 vertical antenna groups 1100, 1105, 1110, and 1115 in the 4×4 antenna array. For example, the CSI-RS defined at the first antenna port may be transmitted to 4 horizontal physical antennas included in the first vertical antenna group 1100, the CSI-RS defined at the second antenna port may be transmitted to 4 horizontal physical antennas included in the second vertical antenna group 1105, the CSI-RS defined at the third antenna port may be transmitted to 4 horizontal physical antennas included in the third vertical antenna group 1110, and the CSI-RS defined at the fourth antenna port may be transmitted to 4 horizontal physical antennas included in the fourth vertical antenna group 1115.

A right side of FIG. 11 illustrates a method for transmitting CSI-RSs defined at different antenna ports to respective horizontal antenna groups by configuring 4 horizontal antenna groups in the 4×4 antenna array. For example, the CSI-RS defined at the first antenna port may be transmitted to 4 vertical physical antennas included in the first horizontal antenna group 1150, the CSI-RS defined at the second antenna port may be transmitted to 4 vertical physical antennas included in the second horizontal antenna group 1155, the CSI-RS defined at the third antenna port may be transmitted to 4 vertical physical antennas included in the third horizontal antenna group 1160, and the CSI-RS defined at the fourth antenna port may be transmitted to 4 vertical physical antennas included in the fourth horizontal antenna group 1165.

In the virtualization antenna transmission scheme, the information (e.g., the precoding weighted value information) acquired in the vertical antenna group or the horizontal antenna group may be used to transmit data in another antenna group (horizontal antenna group or vertical antenna group). For example, the base station may acquire the vertical precoding weighted value information from the channel state information acquired from the terminal based on the CSI-RS transmitted in the vertical antenna group as illustrated at the left side of FIG. 11. The base station may transmit the CSI-RS by granting the precoding weighted value to 4 vertical physical antennas included in the horizontal antenna group at the time of transmitting the CSI-RS based on the horizontal antenna group as illustrated at the right side of FIG. 11. On the contrary, the precoding weighted value information acquired based on the horizontal antenna group may be applied to the time of transmitting data in the vertical antenna group.

Further, according to the embodiment of the present invention, the CSI feedback for the antenna array may be performed by extending a CSI process. The CSI process is introduced to support allocation of multiple CSI-RSs and CSI reporting with respect to each cell when multiple cells transmit data to the terminal like the CoMP. CSI process information may be transmitted through radio resource control (RRC) and include a non-zero power (NZP) CSI-RS configuration, an interference measurement (IM) CSI-RS configuration, CSI reporting configuration information, and the like. For example, the terminal may receive a maximum of 4 CSI processes and receive a maximum of 3 NZP CSI-RSs.

In the existing case, although multiple CSI processes are configured, the respective CSI processes are independently configured, and as a result, the CSI-RS transmission and the CSI reporting may be individually achieved. However, in the massive MIMO system, multiple CSI processes may be requested with respect to multiple antennas. Accordingly, in the massive MIMO system, a relationship may be formed among the CSI processes. That is, in a specific CSI process, the CSI may be estimated by using channel information estimated based on various different CSI processes and the estimated CSI may be reported. In this case, a CSI reference resource of the CSI process that performs the CSI reporting may not be a resource configured in the relevant CSI process. That is, in the massive MIMO, a CSI reference resource of another CSI process may be used to support the multiple CSI processes. The terminal may receive information regarding which other process information needs to be referred through higher layer information at the time of performing an operation for each process. For example, the terminal may receive reference CSI process information from the higher layer and a reference CSI process may be another CSI process referred to report channel state information acquired based on the multiple CSI processes based on one CSI process.

The CSI process needs to be extended in order to effectively support the massive antenna system using extraordinarily numerous physical antennas and the massive MIMO technology for transmitting signals through the massive antenna system. The massive antenna system may include numerous physical antennas. Therefore, when the channel state information of the physical antennas included in the massive antenna system is to be acquired by using the CSI-RSs defined currently, the number of supportable CSI processes and the number of NZP CSI-RSs may be short. Further, in the massive antenna system, additional information on each CSI process may be requested and additional information on the relationship among the respective CSI processes may be required.

Figure 12:
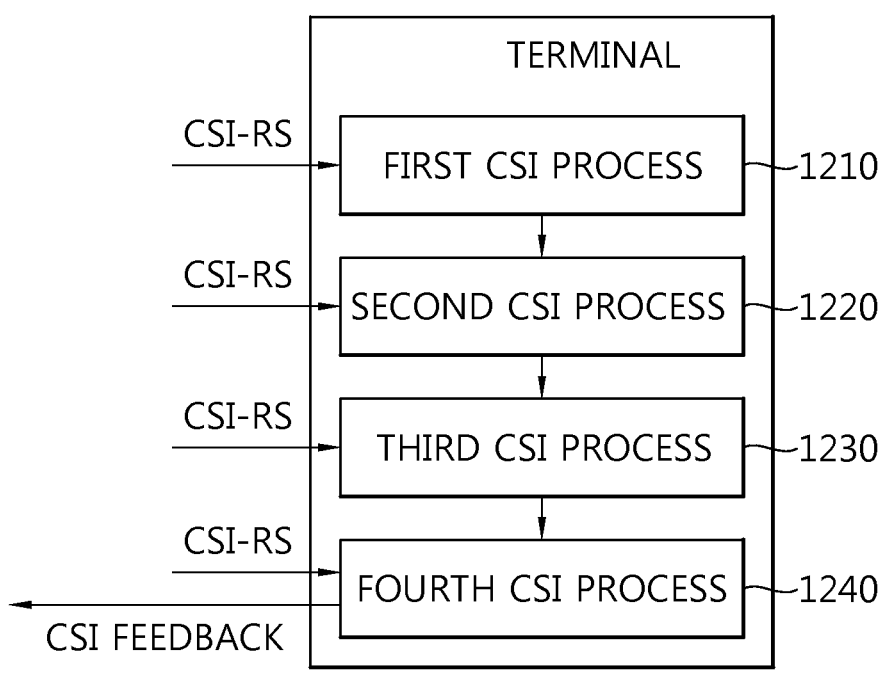
FIG. 12 is a conceptual diagram illustrating a CSI process according to an embodiment of the present invention.

FIG. 12 is a conceptual diagram illustrating a CSI process according to an embodiment of the present invention.

In FIG. 12, the physical antennas included in the 4×4 antenna array are configured as 4 vertical antenna sets and the CSI-RSs are transmitted in the respective antenna sets. According to the embodiment of the present invention, a first CSI process 1210 to a fourth CSI process 1240 may be performed in 4 vertical antenna sets (the first vertical antenna set, the second vertical antenna set, the third vertical antenna set, and the fourth vertical antenna set), respectively, but in one CSI process (e.g., the fourth CSI process 1240 performed last), the terminal may report the channel state information of the physical antennas included in the 4×4 antenna array to the base station. That is, the channel state information is not reported in the first CSI process 1210 to the third CSI process 1230 and only in the fourth CSI process 1240, the channel state information of the physical antennas included in the 4×4 antenna array based on the channel state information measured through the first CSI process 1210 to the third CSI process 1230 and the channel state information measured through the fourth CSI process 1240 may be fed back.

For example, the first vertical antenna set may include 4 horizontal physical antennas and transmit the CSI-RS defined at the first antenna port. The terminal may measure the channel state information based on the CSI-RS transmitted from the first vertical antenna set and perform the first CSI process 1210 that does not report the measured channel state information. In the same method, the terminal may measure the channel state information of the physical antennas included in each antenna set based on the CSI-RSs transmitted in the second and third vertical antenna sets and perform the second CSI process 1220 and the third CSI process 1230 that do not report the measured channel state information.

The terminal may perform the fourth CSI process 1240 that measures the channel state information based on the CSI-RS information transmitted from the fourth vertical antenna set. In the fourth CSI process 1240, the channel state information regarding all physical antennas included in the 4×4 antenna array may be acquired by coupling the channel state information acquired based on the first CSI process 1210 to the third CSI process 1230. That is, in the fourth CSI process 1240, the channel state information acquired based on the previous CSI processes is set to be transmitted to the terminal.

Except for one specific CSI process (e.g., the fourth CSI process 1240), the terminal performs the channel estimation through the received reference signal, but need not report the CSI to the base station. Instead, one specific CSI process (e.g., the fourth CSI process 1240) may include information for reporting the CSI estimated through the channel information of all antennas. To this end, the CSI process information that reports the channel state information of the antenna array may include information instructs the CSI to be reported by referring the CSI-RS information of another CSI process.

For example, the CSI process information transmitted from the RRC may include information on other CSI processes associated with a specific CSI process. In the aforementioned embodiment, configuration information of the fourth CSI process may include identifier information of the first to third CSI processes which are associated CSI processes that report the channel state information. Residual CSI processes used to report the channel state information may be expressed by bitmap information (e.g., 8-bit bitmap information). When the residual CSI processes may be expressed by the 8-bit bitmap information, CSI process information associated with a maximum of 64 antennas based on the CSI-RSs defined at 8 antenna ports.

Further, NZP CSI-RS configuration information included in each CSI process may include antenna port information of the CSI-RS and information on the relationship between the physical antennas in which a CSI defined at a specific antenna port is transmitted. When there is no relations information between physical antennas in which the antenna port information of the CSI-RS and the CSI defined at the specific antenna port are transmitted, the terminal may just know only the antenna port information of the CSI-RS at the time of receiving the NZP CSI-RS included in each CSI process and not know from which the NZP CSI-RS is transmitted, and as a result, ambiguity finally occurs in coupling the channel information. Accordingly, each NZP CSI-RS configuration information may include information on a mapping relationship between the physical antennas included in the antenna array and the CSI-RS antenna ports.

Figure 13:
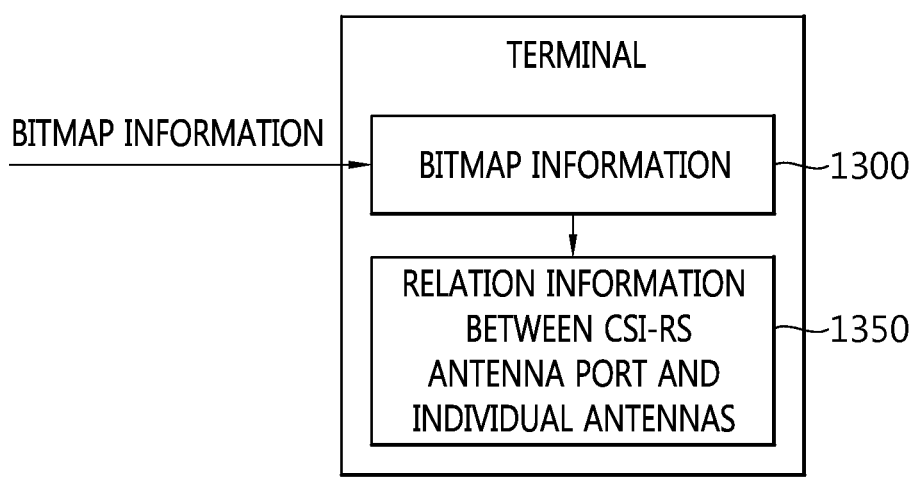
FIG. 13 is a conceptual diagram illustrating transmission of relation information between a CSI-RS antenna port and a physical antenna included in an antenna array based on bitmap information according to an embodiment of the present invention.

FIG. 13 is a conceptual diagram illustrating transmission of relation information between a CSI-RS antenna port and a physical antenna included in an antenna array based on bitmap information according to an embodiment of the present invention.

In FIG. 13, a method in which a terminal receives bitmap information 1300 and acquires information 1350 on a physical antenna transmitting an NZP CSI-RS based on the received bitmap information is disclosed.

Referring to FIG. 13, the relationship information 1350 between the CSI-RS antenna port and the physical antennas included in the antenna array may be expressed by using the bitmap information 1300. For example, the relevance between the physical antennas included in the 4×4 antenna array and the first CSI-RS antenna port may be expressed by the bitmap information 1300 such as {0000 0000 0000 0001, 0000 0000 0001 0000, 0000 0001 0000 0000, 0001 0000 0000 0000}. As another example, the relevance between the physical antennas included in the 4×4 antenna array and the second CSI-RS antenna port may be expressed by {0001 0001 0001 0001, 0010 0010 0010 0010, 0100 0100 0100 0100, 1000 1000 1000 1000}. Relationship information between the CSI-RS antenna port and the physical antennas included in the antenna array may be expressed even by not a binary number but a hexadecimal number. For example, the relevance between the physical antennas included in the 4×4 antenna array and the first CSI-RS antenna port may be expressed by {0x0001, 0x0010, 0x0100, 0x1000}. As yet another example, the relevance between the physical antennas included in the 4×4 antenna array and the second CSI-RS antenna port may be expressed by {0x1111, 0x2222, 0x4444, 0x8888}.

In addition, the information 1350 on the relevance between the antennas included in the antenna array and the CSI-RS antenna port may be expressed by not a bitmap but a matrix. For example, indexes of the physical antennas included in the antenna array and a matrix predefined with respect to the CSI-RS antenna may be acquired. Various forms of the defined matrix are indicated by the indexes, and as a result, the defined matrix may be implemented so as for both the terminal and the base station to know the defined matrix. Since the indexes of the physical antennas included in the antenna array and the matrix predefined with respect to the CSI-RS antenna port may be used, but a form and a configuration method of the physical antenna may be very diversified, the terminal receives the indexes of the physical antennas included in the antenna array and index information indicating the matrix with respect to the CSI-RS antenna port from the base station, and as a result, the base station and the terminal may adaptively share information on the matrix.

Further, when the reference signal is transmitted by using only antennas having low channel correlation in the antenna array like the aforementioned reference signal transmitting method, the terminal may transmit additional information so as to estimate the channel information of all antennas.

Figure 14:
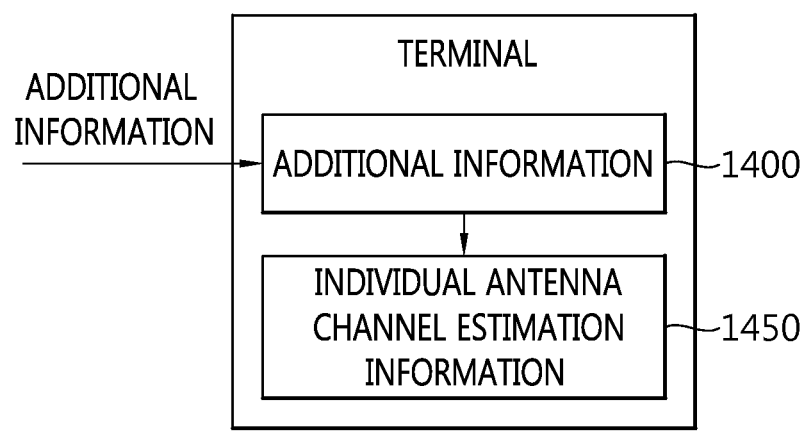
FIG. 14 is a conceptual diagram illustrating a method for estimating channel state information of an antenna array according to an embodiment of the present invention.

FIG. 14 is a conceptual diagram illustrating a method for estimating channel state information of an antenna array according to an embodiment of the present invention.

In FIG. 14, a method in which the terminal receives additional information and estimates the channel information of all physical antennas included in the antenna array is disclosed.

For example, as the additional information 1400, information on the number of physical antennas that do not transmit the reference signal between the physical antennas transmitting the reference signal and information on an interval between the physical antennas may be information for the terminal to estimate channel information 1450 of all physical antennas included in the antenna array.

For example, the NZP CIS-RS configuration information transmitted through the RRC may include the information on the number of physical antennas that do not transmit the reference signal between the physical antennas transmitting the reference signal and the information on the interval between the physical antennas. The additional information may be provided in a predefined limited vector type or an index type therefor as described above. The vectors may be constituted by one or more sets. For example, one antenna interval, two antenna intervals, and four antenna intervals may be expressed by [1 exp jθ1], [1 exp jθ1 exp jθ2], and [1 exp jθ1 exp jθ2 exp jθ3 exp jθ4], respectively. Each phase value may be defined as a constant fixed regardless of actual physical antenna interval and frequency. That is, each phase value may be determined by a candidate correlation value.

As another additional information 1400, when the physical antennas are antenna array configurations which are spatially divided like a 2D planar array antenna, different vectors or index types therefor are predefined with respect to an antenna group for a vertical space and an antenna group for a horizontal space to be provided to the terminal as the additional information 1400.

Hereinafter, the embodiment of the present invention discloses a method in which the terminal reports the CSI to the base station.

As described above, the multiple CSI processes may be requested according to the method for transmitting the reference signal in the antenna array. Further, since the channel state information of the antenna array may not be acquired based on the specific CSI process according to the reference signal transmitting method, the CSI may not be reported in the specific CSI process. For example, when the channel information of all physical antennas is secured through the CSI-RSs of different antenna ports transmitted through the multiple CSI processes, the terminal may report the channel information of all physical antennas only in one specific CSI process.

Further, in all of the respective CSI processes, the channel information including the CSI reporting information may be transmitted to the base station. In this case, in each CSI process, the terminal may transmit the channel state information to the base station as feedback information. In the case of the channel state information, the terminal may transmit a reference CSI in one CSI process by considering overhead of feedback information in performing the feedback and CSIs transmitted in the residual CSI processes may be CSIs which may be acquired based on the reference CSI. For example, a specific CSI process (e.g., a CSI process having a CSI process identifier of 0) may be configured as a reference CSI process. The residual CSI processes other than the reference CSI process may report a CSI determined as a form of a difference value based on the CSI transmitted in the reference CSI process to the base station. For example, as the channel state information such as the PMI, a difference value based on the reference PMI acquired through the reference CSI process may be transmitted to the base station.

As another example, in the aforementioned virtualization antenna transmission scheme, a rank of information on the CSI-RS transmitted from the antenna for the vertical space may be limited. In this case, since the terminal may acquire only the channel information on some physical antennas among the physical antennas included in the antenna array, a meaningless CSI other than specific CSI information may be reported.

Referring back to FIG. 10, the base station may transmit the CSI-RSs defined at 4 antenna ports through 4 physical antennas positioned in the vertical space as illustrated at the left side of FIG. 10. Further, the base station may transmit the CSI-RSs defined at 4 antenna ports in the first to fourth horizontal antenna groups, respectively as illustrated at the right side of FIG. 10.

The terminal may usefully only the PMI in information estimated and reported through the CSI-RSs defined at 4 antenna ports transmitted through 4 vertical physical antennas, which includes a vertical beam direction as illustrated at the left side of FIG. 10. In terms of all physical antennas included in the antenna array, the CSI-RSs defined at 4 antenna ports transmitted in first to fourth horizontal antenna groups may be meaningful values in terms of the RI, the PMI, and the CQI as illustrated at the right side of FIG. 10.

That is, information on some or all of CSIs reported through the specific CSI process may be an inaccurate or inappropriate CSI in order to acquire the channel state information of the physical antennas included in the antenna array. That is, when the terminal calculates and reports the CSI measured in the specific CSI process, since unnecessary calculation and resource waste may be caused, the CSI may be selectively calculated and reported. For example, in the specific CSI process, the CSI including only information on a PMI of rank 1 may be reported to the base station. According to the CSI process, CSI information or a reporting mode to be reported may be additionally configured based on the corresponding CSI process.

In case of the existing scheme, although multiple CSI processes are configured, the respective CSI processes are independently configured, and as a result, the CSI-RS transmission and the CSI reporting are individually achieved. However, in the massive MIMO system described in the embodiment of the present invention, since multiple CSI processes may be requested with respect to the multiple antennas, the relationship may be formed between the CSI processes.

That is, in the specific CSI process, the CSI may be estimated by using the channel information estimated through the CSI-RS configured through various different CSI processes and the estimated CSI may be reported. In this case, a CSI reference resource of the CSI process that performs the CSI reporting is not a resource configured in the relevant CSI process. In the massive MIMO, the CSI reference resource of another CSI process may be used to support the multiple CSI processes.

Figure 15:
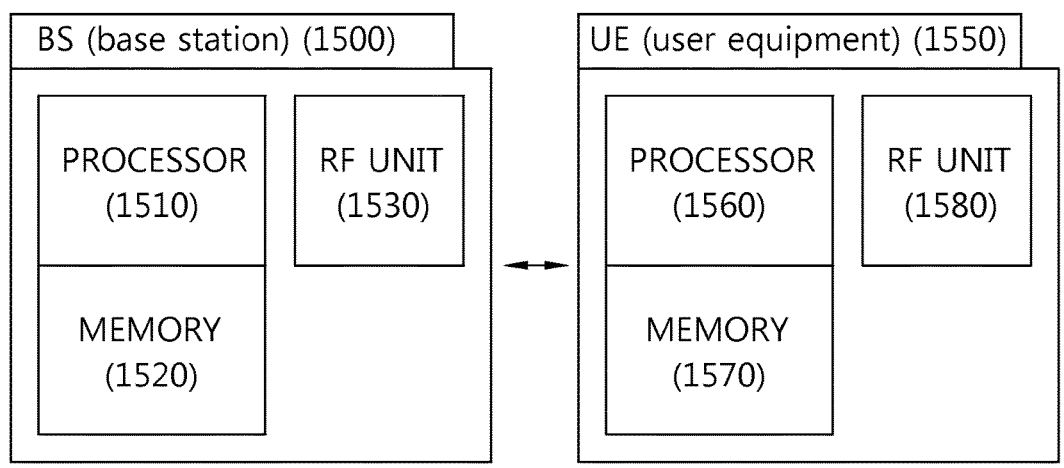
FIG. 15 is a block diagram illustrating a wireless communication system according to an embodiment of the present invention.

FIG. 15 is a block diagram illustrating a wireless communication system according to an embodiment of the present invention.

Referring to FIG. 15, a base station 1500 includes a processor 1510, a memory 1520, and a radio frequency (RF) unit 1530. The memory 1520 is connected with the processor 1510 to store various pieces of information for driving the processor 1510. The RF unit 1520 is connected with the processor 1510 to transmit and/or receive a radio signal. The processor 1510 implements a function, a process, and/or a method which are proposed. In the aforementioned embodiment, the operation of the base station may be implemented by the processor 1510.

For example, a wireless device 1510 includes a processor 1550, a memory 1570, and an RF unit 1580. The memory 1570 is connected with the processor 1560 to store various pieces of information for driving the processor 1560. The RF unit 1580 is connected with the processor 1560 to transmit and/or receive the radio signal. The processor 1560 implements a function, a process, and/or a method which are proposed. In the aforementioned embodiment, the operation of the wireless device may be implemented by the processor 1560.

For example, the processor 1560 receives a channel state information (CSI)-reference signal (RS) and relationship information on physical antennas from the base station and the relationship information may include a first CSI-RS and information on a first physical antenna transmitting the first CSI-RS and a second CSI-RS and information on a second physical antenna transmitting the second CSI-RS. Further, the processor 1560 is implemented to transmit first channel state information and second channel state information to the base station based on the relationship information and herein, the first physical antenna and the second physical antenna are included in one antenna array and the first channel state information may be channel state information between the first physical antenna and the terminal determined based on the first CSI-RS and the second channel state information may be channel state information between the second physical antenna and the terminal determined based on the second CSI-RS.

The processor may include an application-specific integrated circuit (ASIC), another chip set, a logic circuit and/or a data processing device. The memory may include a read-only memory (ROM), a random access memory (RAM), a flash memory, a memory card, a storage medium, and/or other storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for transmitting channel state information, the method performed by a terminal and comprising:
   receiving first information related to a first channel state information-reference signal (CSI-RS) and a first physical antenna from a base station (BS), the first information received via the first physical antenna;
   receiving second information related to a second CSI-RS and a second physical antenna from the BS, the second information received via the second physical antenna;
   generating first CSI based on the first information, the first CSI related to a channel state between the terminal and the first physical antenna;
   generating second CSI based on the second information and the first CSI, the second CSI related to a channel state between the terminal and the second physical antenna; and
   transmitting only the generated second CSI to the BS and not transmitting the generated first CSI,
   wherein a rank is determined as 1 when the first and second antennas are positioned vertically,
   wherein each of the first CSI and the second CSI includes only a precoding matrix index (PMI) based on the determined rank, and
   wherein the first physical antenna and the second physical antenna are included in one antenna array.

2. The method of claim 1, further comprising receiving bitmap information generated based on a number of physical antennas included in an antenna array including the first physical antenna and the second physical antenna.

3. The method of claim 1, further comprising receiving information related to a reference CSI process from a higher layer,
   wherein the reference CSI process is used to generate the first CSI and the second CSI.

4. The method of claim 2, wherein:
   the antenna array is divided into n vertical antenna sets and m horizontal antenna sets with a size of n×m;
   the vertical antenna set is a set of physical antennas divided by rows;
   the horizontal antenna set is a set of physical antennas divided by columns;
   the first physical antenna is included in one vertical antenna set among the n vertical antenna sets;
   the second physical antenna is included in one horizontal antenna set among them horizontal antenna sets;
   n is a natural number of 2 or more; and
   m is a natural number of 2 or more.

5. The method of claim 1, wherein the second CSI-RS is generated by applying a precoding weighted value acquired from the first CSI.

6. A terminal operating in a wireless communication network, the terminal comprising:
   a radio frequency (RF) unit configured to transmit and receive radio signals; and
   a processor operatively connected with the RF unit and configured to:
   control the RF unit to receive first information related to a first channel state information-reference signal (CSI-RS) and a first physical antenna from a base station (BS), the first information is received via the first physical antenna;
   control the RF unit to receive second information related to a second CSI-RS and a second physical antenna from the BS, the second information received via the second physical antenna;
   generate first CSI based on the first information, the first CSI related to a channel state between the terminal and the first physical antenna;
   generate second CSI based on the second information and the first CSI, the second CSI related to a channel state between the terminal and the second physical antenna; and
   control the RF unit to transmit only the generated second CSI to the BS and not transmit the generated first CSI,
   wherein a rank is determined as 1 when the first and second antennas are positioned vertically,
   wherein each of the CSI and the second CSI includes only a precoding matrix index (PMI) based on the determined rank, and
   wherein the first physical antenna and the second physical antenna are included in one antenna array.

7. The terminal of claim 6, wherein the processor is further configured to control the RF unit to receive bitmap information generated based on a number of physical antennas included in an antenna array including the first physical antenna and the second physical antenna.

8. The terminal of claim 6, wherein:
the RF unit is further configured to receive reference CSI process information related to a reference CSI process from a higher layer; and
the reference CSI process is used to generate the first CSI and the second CSI.

9. The terminal of claim 7, wherein:
the antenna array is divided into n vertical antenna sets and m horizontal antenna sets with a size of n×m;
the vertical antenna set is a set of physical antennas divided by rows;
the horizontal antenna set is a set of physical antennas divided by columns;
the first physical antenna is included in one vertical antenna set among the n vertical antenna sets;
the second physical antenna is included in one horizontal antenna set among them horizontal antenna sets;
n is a natural number of 2 or more; and
m is a natural number of 2 or more.

10. The terminal of claim 6, wherein the second CSI-RS is generated by applying a precoding weighted value acquired from the first CSI.

* * * * *